(12) United States Patent
Digonnet et al.

(10) Patent No.: US 11,231,278 B1
(45) Date of Patent: Jan. 25, 2022

(54) SYSTEM AND METHOD FOR GENERATING BROADBAND SPECTRUM BY PHASE MODULATION OF MULTIPLE WAVELENGTHS

(71) Applicant: The Board of Trustees of the Leland Stanford Junior University, Palo Alto, CA (US)

(72) Inventors: Michel J. F. Digonnet, Palo Alto, CA (US); Jonathan M. Wheeler, Mountain View, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 17/071,212

(22) Filed: Oct. 15, 2020

(51) Int. Cl.
*H04B 10/50* (2013.01)
*G01C 19/72* (2006.01)

(52) U.S. Cl.
CPC ......... *G01C 19/727* (2013.01); *G01C 19/721* (2013.01); *H04B 10/503* (2013.01)

(58) Field of Classification Search
CPC ... G01C 19/727; G01C 19/721; H04B 10/503
See application file for complete search history.

(56) References Cited

U.S. PATENT DOCUMENTS

| | | |
|---|---|---|
| 4,848,910 A | 7/1989 | Dupraz |
| 5,137,357 A | 8/1992 | Ferrar et al. |
| 5,327,214 A | 7/1994 | Asami |
| 5,761,225 A | 6/1998 | Fidric et al. |
| 6,744,519 B2 | 6/2004 | Lange et al. |

(Continued)

FOREIGN PATENT DOCUMENTS

| | | |
|---|---|---|
| EP | 0 393 987 | 10/1990 |
| EP | 0 507 536 | 10/1992 |

(Continued)

OTHER PUBLICATIONS

Abramson, "Bandwidth and spectra of phase-and-frequency-modulated waves," IEEE Transactions on Communication Systems, vol. 11, No. 4, pp. 407-414 (1963).

(Continued)

*Primary Examiner* — Jonathan M Hansen
(74) *Attorney, Agent, or Firm* — Knobbe, Martens, Olson & Bear, LLP

(57) ABSTRACT

An optical system includes at least one laser source configured to generate first light having a first spectrum comprising a plurality of first peaks, a waveform generator configured to produce a noise waveform, and an electro-optic phase modulator in optical communication with the at least one laser source and in electrical communication with the waveform generator. The electro-optic phase modulator is configured to receive the first light, to receive the noise waveform, and to respond to the noise waveform by modulating the first light to produce second light having a second spectrum comprising a plurality of second peaks. The peak wavelengths of the second peaks are equal to the peak wavelengths of the first peaks and the linewidths of the second peaks are broader than the linewidths of the corresponding first peaks.

24 Claims, 18 Drawing Sheets
(2 of 18 Drawing Sheet(s) Filed in Color)

(56) References Cited

U.S. PATENT DOCUMENTS

| | | | |
|---|---|---|---|
| 7,515,271 | B2 | 4/2009 | Greening et al. |
| 7,535,576 | B2 | 5/2009 | Keyser et al. |
| 7,911,619 | B2 | 3/2011 | Blin et al. |
| 8,223,340 | B2 | 7/2012 | Digonnet et al. |
| 8,780,948 | B2* | 7/2014 | Wilkinson ............ H01S 3/0057 |
| | | | 372/32 |
| 10,228,250 | B2* | 3/2019 | Chamoun ........... H01S 3/06795 |
| 2004/0165190 | A1 | 8/2004 | Chen et al. |
| 2009/0195785 | A1 | 8/2009 | Blin et al. |
| 2010/0302548 | A1 | 12/2010 | Digonnet et al. |
| 2011/0181887 | A1 | 7/2011 | Tarleton et al. |
| 2011/0304852 | A1 | 12/2011 | Keith et al. |
| 2015/0022818 | A1 | 1/2015 | Lloyd et al. |
| 2016/0022621 | A1 | 8/2016 | Zayhowski et al. |

FOREIGN PATENT DOCUMENTS

| | | |
|---|---|---|
| JP | H03-8382 | 1/1991 |
| JP | H03-503568 | 8/1991 |
| JP | H06-507727 | 9/1994 |
| WO | WO 89/07237 | 8/1989 |
| WO | WO 93/14380 | 7/1993 |
| WO | WO 2014/039128 | 3/2014 |

OTHER PUBLICATIONS

Agrawal, "Semiconductor Lasers", Van Nostrand Reinhold, New York, pp. 269-275 (1993).

Anderson et al., "Experimental study of SBS suppression via white noise phase modulation", Visual Communications and Image Processing, vol. 8961 (2014).

Angelov et al., "A new empirical nonlinear model for HEMT and MESFET devices," IEEE Transaction on Microwave Theory and Techniques, vol. 40, No. 12, pp. 2258-2266 (1992).

Angelov et al., "Extensions of the Chalmers nonlinear HEMT and MESFET model," IEEE Transaction on Microwave Theory and Techniques, vol. 44, No. 10, pp. 1664-1674 (1996).

Blin et al., "Fiber-optic gyroscope operated with a frequency-modulated laser," Proc. SPIE 7004, pp. 70044X-1-10044X-4 (2008).

Blin et al., "Reduced thermal sensitivity of a fiber-optic gyroscope using an air-core photonic-bandgap fiber," Journal of Lightwave Technology, vol. 25, No. 3, pp. 861-865 (2007).

Böhm et al., "Low-drift fibre gyro using a superluminescent diode," Electronics Letters, vol. 17, No. 10, pp. 352-353 (1981).

Burns et al., "Excess noise in fiber gyroscope sources," Photonics Technology Letters, vol. 2, No. 8, pp. 606-608 (1990).

Chamoun et al., "Aircraft-navigation-grade laser-driven FOG with Gaussian-noise phase modulation," Optics Letters, vol. 42, No. 8, pp. 1600-1603 (2017).

Chamoun et al., "Noise and Bias Error Due to Polarization Coupling in a Fiber Optic Gyroscope," Journal of Lightwave Technology, vol. 33, No. 13, pp. 2839-2847 (2015).

Chamoun et al., "Pseudo-random-bit-sequence phase modulation for reduced errors in a fiber optic gyroscope", Optics Letter. vol. 41, No. 24, pp. 5664-5667 (2016).

Chamoun, "A laser-driven fiber optic gyroscope for inertial navigation of aircraft," Ph.D. dissertation, Department of Applied Physics, Stanford University, in 24 pages (2016).

Chou et al., "Wavelength stabilization of broadband semiconductor light sources," Optics Letter, vol. 10, No. 12, pp. 612-614 (1985).

Cutler et al., "Limitation of rotation sensing by scattering," Optics Letters, vol. 5, No. 11, pp. 488-490 (1980).

Dangui et al, "Phase sensitivity to temperature of the fundamental mode in air-guiding photonic-bandgap fibers," Optics Express, vol. 13, No. 18, pp. 6669-6684 (2005).

Dangui, et al. "Laser-driven photonic-bandgap fiber optic gyroscope with negligible Kerr-induced drift," Optics Letters, vol. 34, No. 7, pp. 875-877 (2009).

Digonnet et al., "Recent developments in laser-driven and hollow-core fiber optic gyroscopes," Proceedings of SPIE 9852, Fiber Optic Sensors and Applications XIII, 985204 (2016).

Digonnet et al., "Coherent backscattering noise in a photonic-bandgap fiber optic gyroscope," Proceedings of SPIE 7503, pp. 750302-1-75032-4 (2009).

Drexler et al., "In vivo ultrahigh-resolution optical coherence tomography," Optics Letter, vol. 24, No. 17, pp. 1221-1223 (1999).

Gallion et al., "Quantum phase noise and field correlation in a single frequency semiconductor laser system," IEEE Journal of Quantum Electronics, vol. 20, No. 4, pp. 343-349 (1984).

Gellineau et al., "Design of resonant mirrors with negative group delay," Optics Express, vol. 22, No. 23, pp. 29213-29222 (2014).

Gellineau et al., "Engineering-reflected phase in Fabry-Perot sensors with resonant mirrors", Optics Letters, vol. 38, No. 23, pp. 4992-4995 (2013).

Godone et al., "RF spectrum of a carrier with a random phase modulation of arbitrary slope," Metrologia, vol. 45, No. 3, pp. 313-324 (2008).

Ho et al., "Spectrum of externally modulated optical signals," Journal of Lightwave Technology, vol. 22, No. 2, pp. 658-663 (2004).

IEEE Standard Specification Format Guide and Test Procedure for Single—Axis Interferometric Fiber Optic Gyros, IEEE Std, pp. 952-1997 (1998).

Kim et al., "50-Channel 100-GHz-Spaced Multiwavelength Fiber Lasers with Single-Frequency and Single-Polarization Operation," IEEE Photonics Technology Letters, vol. 20, No. 20, pp. 1718 (2008).

Komljenovic et al., "Frequency modulated lasers for interferometric optical gyroscopes," Optics Letters, vol. 41, No. 8, pp. 1773-1776 (2016).

Krakenes et al., "Effect of laser phase noise in Sagnac interferometers," Journal of Lightwave Technology, vol. 11, No. 4, pp. 643-653 (1993).

Lefevre et al., "All-fiber gyroscope with inertial-navigation short-term sensitivity," Optics Letters, vol. 7, No. 9, pp. 454-456 (1982).

Lefevre et al., "High dynamic range fiber gyro with all-digital signal processing," Proceedings of SPIE 1367, pp. 72-80 (1991).

Lefèvre, "The fiber-optic gyroscope, a century after Sagnac's experiment: The ultimate rotation-sensing technology?," C. R. Physique 15, pp. 851-858 (2014).

Lin et al., "Chaotic lidar," IEEE Journal Selected Topics in Quantum Electronics, vol. 10, No. 5, pp. 991-997 (2004).

Lloyd et al., "Modeling coherent backscattering errors in fiber optic gyroscopes for sources of arbitrary line width," Journal of Lightwave Technology, vol. 31, No. 13, pp. 2070-2078 (2013).

Lloyd et al., "Near shot-noise limited performance of an open loop laser-driven interferometric fiber optic gyroscope," Proceedings of SPIE 7753, pp. 7753A3-1-7753A3-4 (2011).

Lloyd, "Improving fiber optic gyroscope performance using a single-frequency laser," Department of Electrical Engineering, Stanford University, 54 pages.

Mackintosh et al., "Analysis and observation of coupling ratio dependence of Rayleigh backscattering noise in a fiber optic gyroscope," Journal of Lightwave Technology, vol. 7, No. 9, pp. 1323-1328 (1989).

Redding et al., "Speckle-free laser imaging using random laser illumination," Nature Photonics, vol. 6, pp. 355-359 (2012).

Schuma et al., "Superluminescent Diode (SLD) Wavelength Control In High Performance Fiber Optic Gyroscopes," Proceedings of SPIE 0719, Fiber Optic Gyros: $10^{th}$ Anniversary Conf, vol. 192 (1987).

Takada, "Calculation of Rayleigh backscattering noise in fiber-optic gyroscopes," Journal of Optical Society of America, vol. 2, No. 6, pp. 872-877 (1985).

Vikram et al., "Continuously linewidth tunable polarization maintaining narrow linewidth fiber laser," Proceedings of SPIE 10897, Fiber Lasers XVI: Technology and System, pp. 108971V-1-7 (2019).

Yang et al., "Investigation on dispersion of VT of multifunction

(56) References Cited

OTHER PUBLICATIONS integrated optical circuit," 26th International Conference on Optical Fiber Sensors (2019).

* cited by examiner

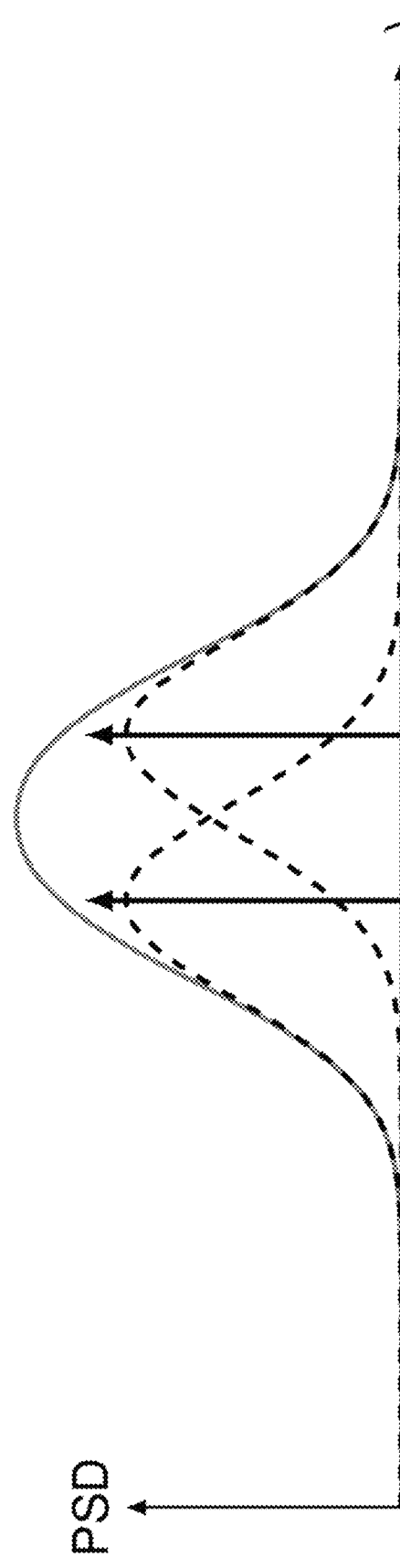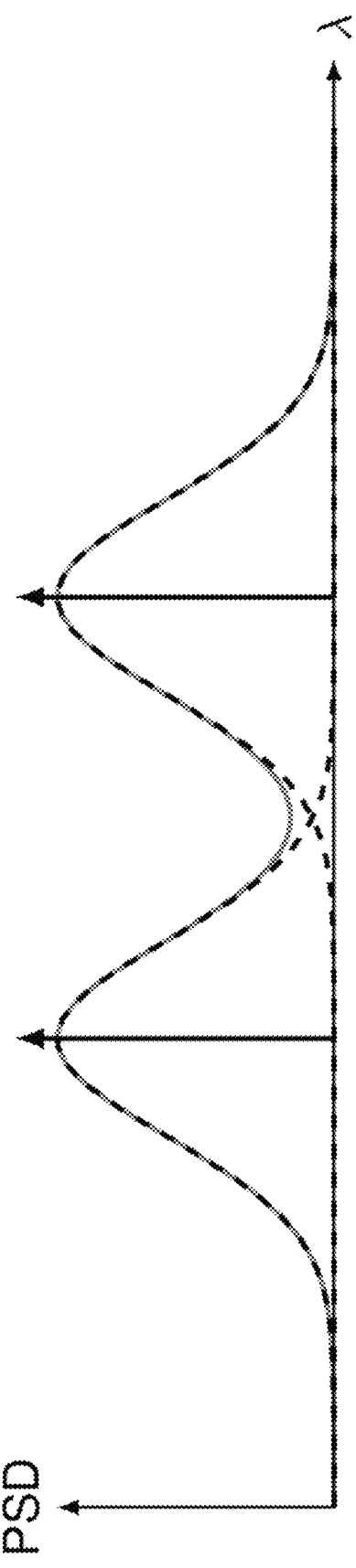

SYSTEM AND METHOD FOR GENERATING BROADBAND SPECTRUM BY PHASE MODULATION OF MULTIPLE WAVELENGTHS

BACKGROUND

Field

The present application relates generally to laser-driven broadened light sources.

Description of the Related Art

In certain classes of two-wave interferometers, in particular for laser imaging (see, e.g., B. Redding et al., "Speckle-free laser imaging using random laser illumination," *Nat. Photon.*, vol. 6, pp. 355-359, April 2012), rotation sensing (see, e.g., H. C. Lefèvre, "The fiber-optic gyroscope, a century after Sagnac's experiment: The ultimate rotation-sensing technology?" *C. R. Phys.*, vol. 15, no. 10, pp. 851-858, November 2014), and optical coherence tomography (see, e.g., W. Drexler et al., "In vivo ultrahigh-resolution optical coherence tomography," *Opt. Lett.*, vol. 24, no. 17, pp. 1221-1223, 1999), spurious signals arising from imperfections such as scatterers interfere coherently with the measured signal and add noise and/or drift to it. These applications benefit from the use of incoherent light, which eliminates these interferometric effects outside of a small spatial region of interest.

For example, some LIDAR systems use incoherent light to "see through" atmospheric turbulence and scattering from aerosols to measure displacements of distant objects (see, e.g., F. Y. Lin and J. M. Liu, "Chaotic lidar," *IEEE J. Sel. Top. Quantum Electron.*, vol. 10, no. 5, pp. 991-997, September 2004). In medical imaging instruments, incoherent light is used to image $\mu m^3$ volumes inside a tissue that would otherwise be difficult to resolve with coherent light due to background reflections from surrounding tissue (see, e.g., Drexler 1999).

Fiber-optic gyroscopes (FOGs) measure extremely small path-length differences (10 fm or less) to infer rotation rates as small as a full turn in 2200 years (see, e.g., Lefèvre 2014). Incoherent light gives FOGs their superb precision by significantly reducing the noise and drift arising from spurious interference from light backscattered (see, e.g., M. J. F. Digonnet et al., "Coherent backscattering noise in a photonic-bandgap fiber optic gyroscope," 20th Int. Conf. Opt. Fibre Sensors, vol. 7503, pp. 750302-1-4, October 2009; S. W. Lloyd et al., "Modeling coherent backscattering errors in fiber optic gyroscopes for sources of arbitrary line width," *J. Lightwave Technol.*, vol. 31, no. 13, pp. 2070-2078, July 2013) or polarization coupled (see, e.g., N. Chamoun and M. J. F. Digonnet, "Noise and bias error due to polarization coupling in a fiber optic gyroscope," *J. Lightwave Technol.*, vol. 33, no. 13, pp. 2839-2847, April 2015) along the fiber coil. Incoherent light may also be useful in demonstrating "zero-length" optical cavities (see, e.g., A. Gellineau et al., "Design of resonant mirrors with negative group delay," *Opt. Express*, vol., no. 23, pp. 29213-29222, November 2014; A. Gellineau et al., "Engineering-reflected phase in Fabry-Perot sensors with resonant mirrors," *Opt. Lett.*, vol. 38, no. 23, pp. 4992-4995, December 2013). Stimulated Brillouin scattering, which can limit power scaling of fiber lasers, can also be mitigated by externally modulating the phase of the laser with noise to broaden its linewidth (see, e.g., B. S. Vikram et al., "Continuously linewidth tunable polarization maintaining narrow linewidth fiber laser," *Proc. SPIE* 10897, *Fiber Lasers XVI: Technology and System*, pp. 108971V-1-7, March 2019; B. Anderson et al., "Experimental study of SBS suppression via white noise phase modulation," *Proc. SPIE*, vol. 8961, pp. 89611W-1-7, February 2014).

Because the degree of coherence is inversely proportional to the optical bandwidth, to reduce coherence, the light can be selected to have a large bandwidth. For example, bandwidths of GHz (see, e.g., Lin 2004; Lloyd 2013; Vikram 2019; Anderson 2014) or THz (see, e.g., Redding 2012; Lefèvre 2014; Drexler 1999) have been used. Most applications meet this goal by using either a pulsed laser or a continuous-wave rare-earth-doped superfluorescent fiber source (SFS). While SFSs perform well for many applications, they have two significant limitations. Their relative intensity noise (RIN) is high, which increases (and sometimes limits) the noise. They also have a poor mean-wavelength stability, which in a FOG introduces a significant error in the measured absolute rotation rate.

SUMMARY

In certain implementations, an optical system comprises at least one laser source configured to generate first light having a first spectrum comprising a plurality of first peaks. Each first peak has a corresponding peak wavelength and a corresponding linewidth. The optical system further comprises a waveform generator configured to produce a noise waveform. The optical system further comprises an electro-optic phase modulator in optical communication with the at least one laser source and in electrical communication with the waveform generator. The electro-optic phase modulator is configured to receive the first light, to receive the noise waveform, and to respond to the noise waveform by modulating the first light to produce second light having a second spectrum comprising a plurality of second peaks. Each second peak has a corresponding peak wavelength and a corresponding linewidth. The peak wavelengths of the second peaks are equal to the peak wavelengths of the first peaks and the linewidths of the second peaks are broader than the linewidths of the corresponding first peaks.

In certain implementations, a method produces laser-based broadband light for use in an optical device. The method comprises using at least one laser to generate first light having a first spectrum comprising a plurality of first peaks. Each first peak has a corresponding peak wavelength and a corresponding linewidth, and adjacent first peaks are not substantially overlapping one another. The method further comprises, in response to a noise waveform, modulating the first light to have a second spectrum comprising a plurality of second peaks. Each second peak has a corresponding peak wavelength and a corresponding linewidth. The peak wavelengths of the second peaks are equal to the peak wavelengths of the first peaks. The linewidths of the second peaks are broader than the linewidths of the first peaks.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 17A schematically illustrates two peak wavelengths of the first light outputted from the laser source spaced close together (such that when broadened, the peaks of the second light substantially overlap) in accordance with certain implementations described herein.

FIG. 17B schematically illustrates two peak wavelengths of the first light outputted from the laser source spaced far apart from one another (such that when broadened, the peaks of the second light do not substantially overlap) in accordance with certain implementations described herein.

DETAILED DESCRIPTION

Figure 1:
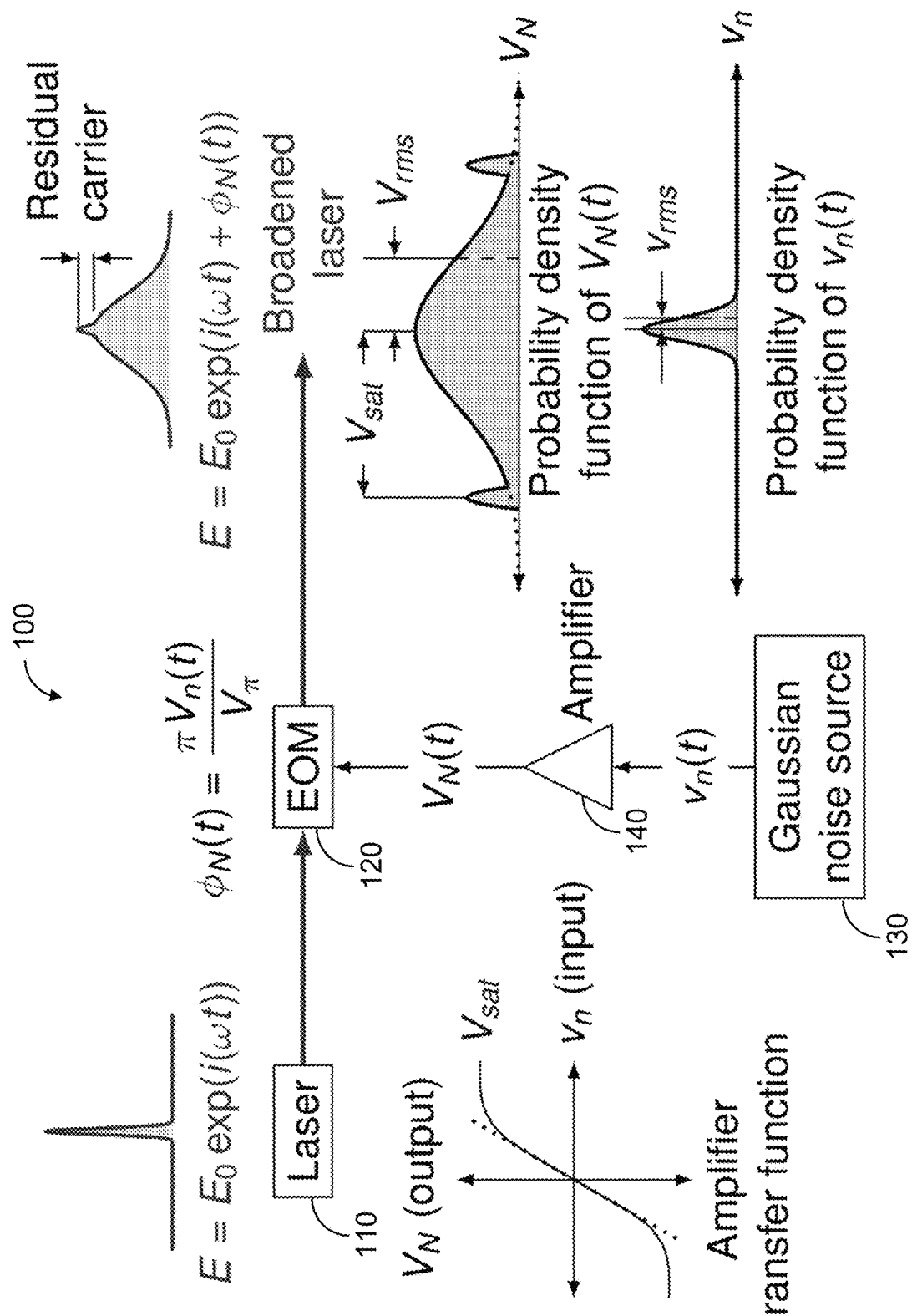
FIG. 1 schematically illustrates a block diagram of an example broadened laser, amplifier transfer function, and probability density function (PDF) of the electrical noise, before and after amplification, in accordance with certain implementations described herein.

The bandwidth of a laser has been broadened by sending its output through an electro-optic phase modulator (EOM) driven by broadband RF noise (see, e.g., Vikram 2019; J. Chamoun and M. J. F. Digonnet, "Aircraft-navigation-grade laser-driven FOG with Gaussian-noise phase modulation," *Opt. Lett.*, vol 42, no. 8, pp. 1600-1603, April 2017; J. N. Chamoun, "A laser-driven fiber optic gyroscope for inertial navigation of aircraft," Ph.D. dissertation, Dept. App. Phys., Stanford Univ., 2016). For weak modulation, some of the carrier power is redistributed into symmetric sidebands whose frequency spectra mirror the RF frequency spectrum. As the modulation amplitude is increased, the power in the sidebands is further redistributed into higher order sidebands, and sidebands convolve with each other: the optical spectrum therefore smooths out into a Gaussian distribution with a broad bandwidth. This bandwidth is independent of the original laser linewidth, when the former is significantly broader than the latter. This method has produced bandwidths ranging from 1.5 GHz (see, e.g., Anderson 2014) to about 10 GHz (see, e.g., Vikram 2019) and 42 GHz (see, e.g., Chamoun 2017). Over some range of sufficiently strong modulation, only a small fraction $f_c$ (about $10^{-4}$) of residual carrier remains (see, e.g., N. Abramson, "Bandwidth and spectra of phase-and-frequency-modulated waves," *IEEE Trans. Commun. Syst.*, vol. 11, no. 4, pp. 407-414, December 1963). This technique offers the benefits of preserving the laser's mean-wavelength stability and producing light with a RIN far lower than the RIN of an SFS.

Although the method of broadening increases the linewidth, and therefore reduces the overall coherence of the laser, a small amount of power remains in the coherent residual carrier. Unless the fraction of power in this residual carrier is substantially reduced, it can dominate the coherence of the laser, and can limit its use in applications where a high degree of incoherence is desired. For example, the backscattering noise in a FOG utilizing a 25-kHz laser broadened to 25 GHz, with 1% of the power remaining in the carrier, decreases with increasing optical bandwidth $\Delta v$ as $1/\sqrt{\Delta v}$ (see, e.g., Lloyd 2013; Chamoun 2017). Hence, while the broadband component reduces the noise by $(25 \text{ GHz}/25 \text{ kHz})^{1/2}$, or −30 dB, the noise from the residual 25-kHz carrier is still 1% of the original noise, or −20 dB. For a carrier suppression of 0.01%, the noise is reduced by the full −30 dB.

In LIDAR applications, atmospheric and aerosol reflections can also introduce spurious two-wave interferometers. When the interferometer's arms lengths differ by more than a few coherence lengths $L_c$, the fields interfere on average incoherently, and the interferometer output is insensitive to perturbations. The laser bandwidth $\Delta v$ for achieving a target spatial resolution $\Delta L$ in a medium with a refractive index substantially equal to 1 (e.g., air) is then $\Delta v \approx c/\Delta T$. For a 1-cm resolution, a bandwidth of a few tens GHz can be used. A bandwidth of a few THz can be used for retina imaging with sub-millimeter resolution (see, e.g., Drexler 1999). However, even just 1% of residual carrier introduces 1% of coherent reflections and can spoil the image quality.

In general, increasing the RF noise voltage applied to the EOM reduces $f_c$ exponentially (see, e.g., Abramson 1963; D. Middleton, *An Introduction to Statistical Communication Theory*, Piscataway, N.J., USA: Wiley, pp. 604-605, 1996; Chamoun 2016; A. Godone et al., "RF spectrum of a carrier with a random phase modulation of arbitrary slope," *Metrologia*, vol 45, no. 3, pp. 313-324, May 2008). However, prior experimental studies reported that at large RF voltages the carrier suppression degrades while the bandwidth continues to increase (see, e.g., Anderson 2014; Chamoun 2017), leading to a narrow range of RF voltages that optimally suppress the carrier. Thus, there is a need to understand why $f_c$ degrades at large RF powers, why the range of voltages that optimally suppress $f_c$ is so narrow, and how to possibly expand this range to make the broadened source more robust against temperature and other environmental changes.

A closed-form equation is disclosed herein for describing the residual carrier in a laser of arbitrary linewidth broadened with a phase modulator driven with noise of arbitrary probability density function (PDF). This equation can be used to predict three properties of this broadened source.

- The observed degradation of the carrier suppression at high RF voltages that can be caused by saturation in the amplifiers;
- This saturation allows for near-perfect carrier suppressions at lower RF power than possible without saturation, which can reduce the power to be provided to the amplifiers, albeit at the expense of a tighter tolerance on the RF power; and
- The tolerance in RF power can be significantly relaxed if $V_\pi$ is reduced and/or $V_{sat}$ is increased. For example, such a low-tolerance operating point can be achieved with a $V_\pi$ of 3 V, a $V_{sat}$ of ±21 V, and an uncompressed noise probability density function (PDF) with a $V_{rms}$ of 11.10±8.154 V.

This third property can be of particular interest in applications with extended operation over a wide temperature range, since the noise source, amplifier, and EOM can operate differently at different temperatures, and may degrade with age.

Extinction Ratio Model

A simple analytical expression for the carrier suppression in a laser broadened by any arbitrary random phase modulation waveform is disclosed herein, with a focus on Gaussian white noise generated with saturated amplifiers. The model described herein also advantageously provides an approximate expression for the lineshape of the broadened spectrum in the hitherto not modeled region between the weak and strong modulation limits in the presence of saturation, as well as outside of this region. Conditions are derived for the voltage $V_{rms}$ applied to the EOM, the saturation voltage $V_{sat}$ of an amplifier of the amplifier chain (e.g., the final amplifier of the at least one amplifier), and the $V_\pi$ of the EOM for producing maximum carrier suppression (e.g., such that a voltage $V_\pi$ produces a $\pi$ phase shift). The voltage $V_\pi$ depends on various factors, including but not limited to: the electrooptic efficiency of the EOM, length of the EOM, the spacing between the electrodes of the EOM, and the overlap between the electric field generated by the voltage applied to the electrodes and the optical mode field in the waveguide. The model disclosed herein can facilitate the design of broadened lasers suitable for a wide range of interferometers, including high-accuracy FOGs and LIDARs.

FIG. 1 schematically illustrates a block diagram of an example broadened laser 100, amplifier transfer function, and probability density function (PDF) of the electrical noise, before and after amplification, in accordance with certain implementations described herein. As shown in FIG. 1, the broadband laser 100 comprises a laser source 110 configured to provide laser light (e.g., $E=E_0 \exp(i\omega t)$) and an electro-optic phase modulator (EOM) 120 configured to receive the laser light. The broadband laser 100 further comprises a noise source 130 (e.g., broadband Gaussian noise source) configured to generate a white noise signal (e.g., voltage) $v_n(t)$ with a Gaussian PDF (see, e.g., Chamoun 2017) with an rms voltage of $v_{rms}$. The broadened laser 100 further comprises at least one amplifier 140 (e.g., a high-bandwidth RF amplifier) configured to amplify the white noise voltage $v_n(t)$ from the noise source 130 to a sufficient noise voltage $V_N(t)$ to drive the EOM 120. For example, as shown on the right-hand side of FIG. 1, the at least one amplifier 140 amplifies the white noise voltage $v_n(t)$ to a stronger noise voltage $V_N(t)$ with a wider PDF. The finite power-supply voltages of approximately $\pm V_{sat}$ supplied to the at least one amplifier 140 cause the output of the at least one amplifier 140 to saturate when large input voltages are applied, as shown in the transfer function on the left side of FIG. 1. This saturation causes the absolute voltages beyond $\pm V_{sat}$ in the tails of the amplified noise PDF to be compressed into lobes at $\pm V_{sat}$ (see PDF of $V_N(t)$ in FIG. 1). The standard deviation of the final amplifier's input signal $p(v_n)$ is $v_{rms}$. The standard deviation of the amplified PDF $P(V_N)$ is therefore approximately $V_{rms}=Gv_{rms}$, where G is the gain of the last amplifier. The EOM 120 converts $V_N(t)$ into an optical phase shift $\varphi_N(t)$, through the proportionality constant $\pi/V_\pi$, and the optical phase shift is applied to the laser light. The modulated signal output from the EOM 120 (e.g., $E=E_0 \exp(i\omega t+\varphi_N(t))$) has a broad linewidth (e.g., several GHz), plus a small fraction $f_c$ of residual carrier suppression. In certain implementations, the laser light from the laser source 110 is continuous-wave, while in certain other implementations, the laser light from the laser source 110 is pulsed.

Figure 2A:
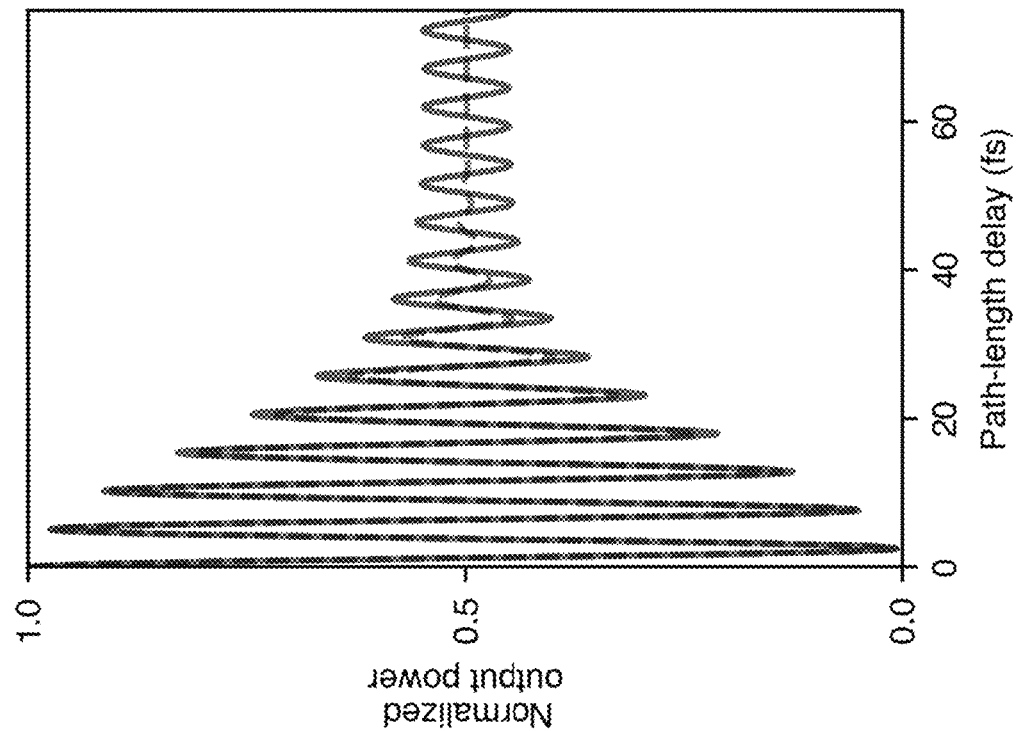
FIG. 2A shows an optical spectrum of an example laser homogeneously broadened to a Gaussian lineshape with a 10-THz linewidth with no residual carrier, and an optical spectrum of an example laser with the same broadened Gaussian lineshape plus 10% of residual carrier (e.g., 500-GHz linewidth).

In certain implementations having photonic systems utilizing low-coherence light (e.g., LIDAR; FOGs), noise and drift in the measured signal arise from spurious interferometers caused, for example, by scatterers. A Mach-Zehnder interferometer (MZI) can be used to model a spurious interferometer to show how the source coherence affects the magnitude of these errors, the MZI having an optical-path delay $\tau=n\Delta L/c$, where $\Delta L$ is the length difference between the two arms, n is the refractive index of the arms, and c is the speed of light in vacuum. For example, for LIDAR, $\Delta L$ can represent twice the distance between the target (which produces the main reflected signal of interest) and a scatterer (which produces a spurious reflected signal), and the MZI beam splitters can be lossless 50% couplers. FIG. 2A shows an optical spectrum of an example laser homogeneously broadened to a Gaussian lineshape with a 10-THz linewidth with no residual carrier (dashed curve), and an optical spectrum of an example laser with the same broadened Gaussian lineshape plus 10% of the power in the residual carrier (e.g., 500-GHz linewidth; solid curve). The large linewidth of FIG. 2A is for illustrative purposes, to put the interferometric fringes and the coherence length on roughly the same length scale so as to be easily discerned in FIG. 2B.

Figure 2B:
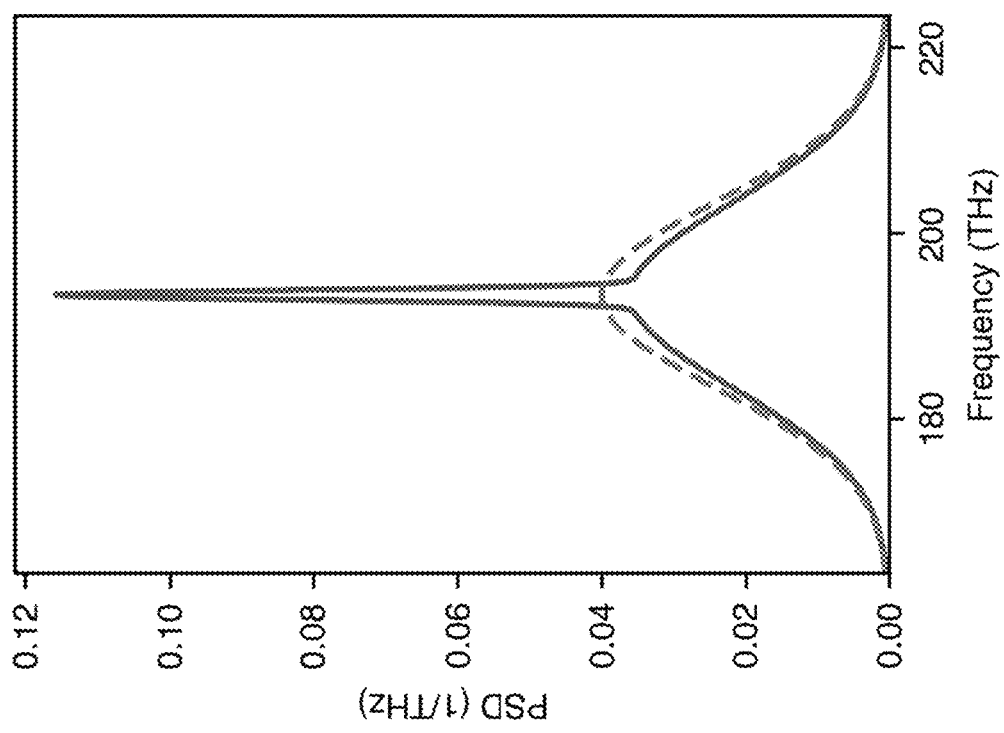
FIG. 2B shows an example average interferometric output power plotted as a function of the path-length delay for an example two-wave Mach-Zehnder interferometer driven by one or the other of the two broadened lasers of FIG. 2A.

FIG. 2B shows an example average interferometric output power plotted as a function of the path-length delay τ for an example two-wave Mach-Zehnder interferometer driven (e.g., interrogated) by one or the other of the two broadened lasers of FIG. 2A. As the path-length delay τ is increased, the output power exhibits interference fringes with an envelope or contrast Γ(τ) having diminishing amplitude. For a MZI interrogated by the broadened laser with no residual carrier (dashed curve of FIG. 2A), this contrast can be expressed as (see, e.g., H. C. Lefèvre, *The Fiber-Optic Gyroscope*, Boston, Mass., USA: Artech House, pp. 262, 2014):

$$\Gamma(\tau) = \exp(-\tau^2 (2\pi \Delta f)^2 / 2) \quad (1)$$

where $\Delta f$ is the broadened linewidth. The amplitude of the contrast Γ(τ) decreases exponentially with increasing τ until the fringes become vanishingly small (dashed curve of FIG. 2B). The coherence time of the laser $\tau_c$ is the optical path delay that reduces the amplitude of the contrast to 1/e. When $\tau \gg \tau_c$, the average output power of the MZI is independent of τ, and therefore independent of fluctuations in τ. The output power is then highly stable against fluctuations, and consequently it produces little drift or noise.

For a MZI interrogated by the broadened laser with residual carrier (solid curve of FIG. 2A), the PDF is the sum of a broadband signal with normalized amplitude $f_b$ and linewidth $\Delta f_b$ and a narrow-linewidth signal with normalized residual carrier suppression with amplitude $f_c$ and linewidth $\Delta f_c$, with $f_b + f_c = 1$. Applying the superposition principle to Eq. (1), the contrast Γ(τ) can be expressed as:

$$\Gamma(\tau) = f_b e^{-\tau^2 (2\pi \Delta f_b)^2 / 2} + f_c e^{-\tau^2 (2\pi \Delta f_c)^2 / 2} \quad (2)$$

Eq. (2) states that for the broadened laser with residual carrier of FIG. 2A (e.g., having $f_b = 0.9$ and $f_c = 0.1$), as the path-length delay τ is increased, Γ(τ) decreases exponentially and asymptotically approaches a finite value equal to $f_c$ (when $1/\Delta f_b \ll \tau \ll 1/\Delta f_c$). This result is consistent with FIG. 2B (solid curve), which shows that for large τ, the output power of the MZI does not go to zero but continues to oscillate, up to a path-length delay τ of about $1/\Delta f_c$, which is much larger than the highest value of τ shown in FIG. 2B. Thus, in the presence of residual carrier, there is a wide range of path-length mismatch (e.g., corresponding to path-length delays from about 50 fs to much larger values) over which the output power of the MZI is sensitive to length fluctuations. This behavior is undesirable in various contexts (e.g., LIDAR), because it implies that a large number of scatterers contribute to noise and drift. This analysis shows that the carrier suppression $f_c$ can be modeled simply as the contrast of an MZI at a large delay.

To derive an analytical expression of the contrast, the output field of a laser modulated by a phase noise $\varphi_N(t)$ can be expressed as:

$$E(t) = \frac{E_0}{2} \exp(i\omega t + i\varphi_N(t)) \quad (3)$$

where t is time and ω is the mean optical frequency. At the MZI output, the field interferes with a replica of itself delayed by τ. For a given delay the average interferometric power can be expressed as:

$$\frac{\langle P(\tau) \rangle}{P_0} = \frac{E\{|E(t) + E(t-\tau)|^2\}}{E_0^2} \quad (4)$$

$$= \frac{1}{2} + \frac{1}{2}\cos(\omega\tau) E\{\cos(\Delta\varphi_N(t, \tau))\}$$

$$- \frac{1}{2}\sin(\omega\tau) E\{\sin(\Delta\varphi_N(t, \tau))\}$$

where E{ } is the expectation value (to model the time-averaging in the finite-detection bandwidth), $\Delta\varphi_N(t, \tau) = \varphi_N(t) - \varphi_N(t-\tau)$ is the phase difference between the fields., and the probability density function (PDF) of $\Delta\varphi_N$ is $p_{\Delta\varphi}(\Delta\varphi_N)$ which has zero mean and which can be assumed to be symmetric, such that $E\{\sin(\Delta\varphi_N(t, \tau))\} = 0$. The PDF can be slightly asymmetric if the slew rates of the increasing and decreasing voltages differ, which does occur in amplifiers but it is generally negligible. Perfect symmetry can be assumed for providing a simpler model that fits the measured data very well, as disclosed more fully herein.

Under this assumption, Eq. (4) can be expressed as:

$$\frac{\langle P(\tau) \rangle}{P_0} = \frac{1}{2} + \frac{1}{2}\cos(\omega\tau) E\{\cos(\Delta\varphi_N(t, \tau))\} \quad (5)$$

$$= \frac{1}{2}(1 + \Gamma(\tau)\cos(\omega\tau))$$

and the contrast Γ(τ) can be expressed as:

$$\Gamma(\tau) = E\{\cos(\Delta\phi_N(t, \tau))\} = \int_{-\infty}^{\infty} \cos(x) p_{\Delta\phi}(x) dx. \quad (6)$$

The carrier suppression $f_c$ can be determined by calculating Γ(τ) for τ larger than a few coherence times of the broadened laser (see, e.g., Middleton 1996). In this limit, $\varphi_N(t)$ and $\varphi_N(t+\tau)$ are statistically independent (they are statistically correlated if 1/τ is smaller than the noise bandwidth). The PDF of $\varphi_N(t) - \varphi_N(t+\tau)$ can be obtained by taking the auto-convolution of $p_\varphi(\varphi - \langle\varphi\rangle)$, where $\langle\varphi\rangle$ is the expectation value of φ, and in certain implementations can be assumed to be zero. $p_\varphi(\varphi)$ is proportional to $P(V_N)$, the PDF of $V_N(t)$ from which they were sampled (e.g., $p_\varphi(\varphi) = V_\pi/\pi \cdot P(\varphi = \pi V_N/V_\pi)$), and the carrier suppression can be expressed as a convolution (*):

$$f_c = \int_{\infty}^{-\infty} \cos\left(\frac{\pi V_N}{V_\pi}\right) \cdot P(V_N - \langle V_N\rangle) * P(V_N - \langle V_N\rangle) dV \quad (7)$$

Eq. (7) provides a simple means for calculating the carrier suppression from the physical parameters $P(V_N)$ and $V_\pi$. To evaluate Eq. (7), the value of $V_\pi$, which is known, and $P(V_N)$, which is generally not, can be used. The PDF can be either measured with an oscilloscope, or calculated (e.g., using the method illustrated in FIG. 12). The PDF can be calculated by converting the PDF of the Gaussian PDF of $v_n(t)$ through the nonlinear transfer function $f(v_n)$ of the amplifier. To this end, the quantities that are used are $p(v_n)$ and $f(v_n)$. The PDF of $v_n$ can be a Gaussian (since the first seven amplifiers are linear), with a mean μ (e.g., non-zero due to a small offset added to the noise voltage by the first seven amplifiers) and a standard deviation $v_{rms}$. $P(V_N)$ is related to $p(v_n)$ by (see, e.g., M. Fisz, Probability Theory and Mathematical Statistics, New York, N.Y., USA: John Wiley & Sons, Inc., pp. 36-40):

$$P(V_N) = p(f^{-1}(V_N)) \left| \frac{d}{dV_N} f^{-1}(V_N) \right| \tag{8}$$

As illustrated in the PDF shown in the top right corner of FIG. 1, the effect of saturation in the last amplifier is to distort the originally Gaussian input PDF.

Eq. (8) can be evaluated using knowledge of the final amplifier nonlinear transfer function. The transfer function can have a sigmoidal shape that depends on multiple physical parameters and therefore cannot be described by a canonical function. It can, however, be represented by a function involving a hyperbolic tangent function and polynomials of the input voltage (see, e.g., I. Angelov, H. Zirath, and N. Rorsman, "A new empirical nonlinear model for HEMT and MESFET devices," IEEE Trans. Microwave Theory Tech., vol. 40, no. 12, pp. 2258-2266, December 1992; I. Angelov, L. Bengtsson, and M. Garcia, "Extensions of the Chalmers nonlinear HEMT and MESFET model," IEEE Trans. Microwave Theory Tech., vol. 44, no. 10, pp. 1664-1674, October 1996). As shown in Eq. (9), the transfer function can be modeled with a hyperbolic tangent function (e.g., as in Angelov 1996), but with fewer free parameters for simplicity:

$$\frac{V_N}{V_{sat}} = \tag{9}$$

$$\frac{f(v_n)}{V_{sat}} = \begin{cases} x_a + (1+x_a)\tanh\left(\frac{Gv_n - V_{sat}x_a}{V_{sat}(1+x_a)}\right), & Gv_n < x_a V_{sat} \\ \frac{Gv_n}{V_{sat}}, & x_a V_{sat} \le Gv_n \le x_b V_{sat} \\ x_b + (1-x_b)\tanh\left(\frac{Gv_n - V_{sat}x_b}{V_{sat}(1-x_b)}\right), & Gv_n > x_b V_{sat} \end{cases}$$

where $v_n$ is the input voltage, and G is the small-signal gain of the final amplifier. In general, the transfer function of an RF amplifier is asymmetric because positive and negative voltages saturate with slightly different transfer functions. This asymmetry is modeled in Eq. (9) by the parameters $x_a$ and $x_b$, which are the lower and upper bounds of the amplifier's linear range, respectively. The values of $x_a$ and $x_b$ can be between −1 and 1, provided $x_b > x_a$. Eq. (8) utilizes the inverse of this transfer function, which has the form:

$$v_n = f^{-1}(V_N) = \tag{10}$$

$$\frac{V_{sat}}{G} \begin{cases} x_a + \tanh^{-1}\left(\frac{V_N - x_a V_{sat}}{V_{sat}(1+x_a)}\right)(1+x_a), & V_N < x_a V_{sat} \\ V_N / V_{sat}, & x_a V_{sat} \le V_N \le x_b V_{sat} \\ x_b + \tanh^{-1}\left(\frac{V_N - x_b V_{sat}}{V_{sat}(1-x_b)}\right)(1-x_b), & V_N > x_b V_{sat} \end{cases}$$

Figure 12:
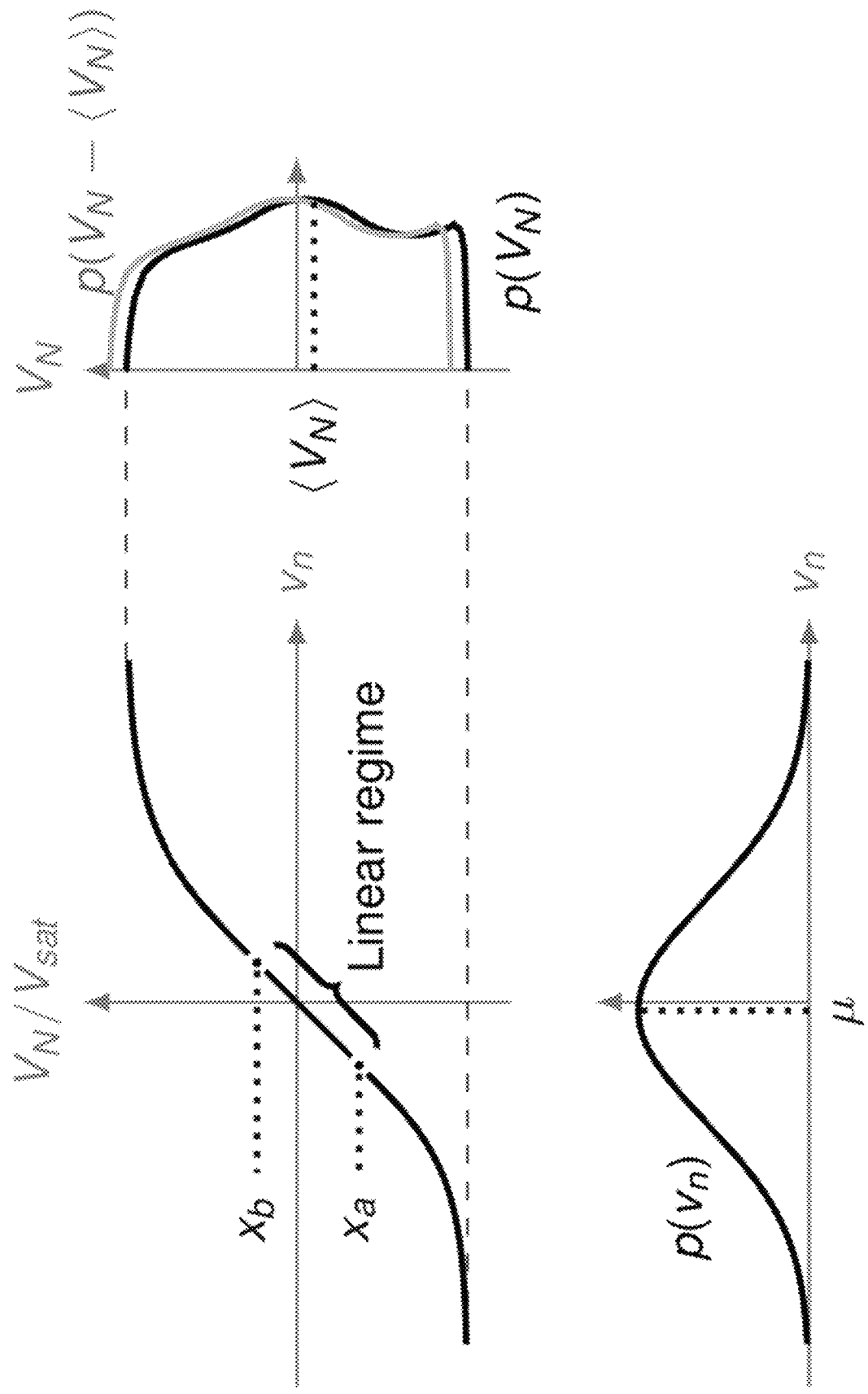
FIG. 12 graphically illustrates a method of transforming an input PDF to an output PDF with a known transfer function in accordance with certain implementations described herein.

The PDF of the input signal can be expressed as a function $p(v_n)$ having the form of a Gaussian:

$$p(v_n) = \frac{1}{\sqrt{2\pi v_{rms}^2}} \exp\left(-\frac{(v_n - \mu)^2}{2v_{rms}^2}\right) \tag{11}$$

where $v_{rms}$ represents the standard deviation of the input and is equal to $V_{rms}/G$, and $\mu$ represents the mean value of the input Gaussian. FIG. 12 graphically illustrates this method of transforming the input PDF to an output PDF with a known transfer function in accordance with certain implementations described herein.

To summarize, the carrier suppression can be expressed by Eq. (7). For a given amplifier chain, Eq. (7) can be evaluated by measuring the parameters $V_{sat}$, G, $x_a$, and $x_b$, of the last amplifier, which determine the transfer function $f(v_n)$ in Eq. (9); then measuring the $v_{rms}$ and $\mu$ of the Gaussian noise applied to the last amplifier, which determine $v_n(t)$ and therefore its PDF $p(v_n)$. The functions $f(V_N)$ and $p(v_n)$ can then be used in Eq. (8) to compute $P(V_N)$, which can be inserted into Eq. (7) to obtain the carrier suppression.

Figure 3:
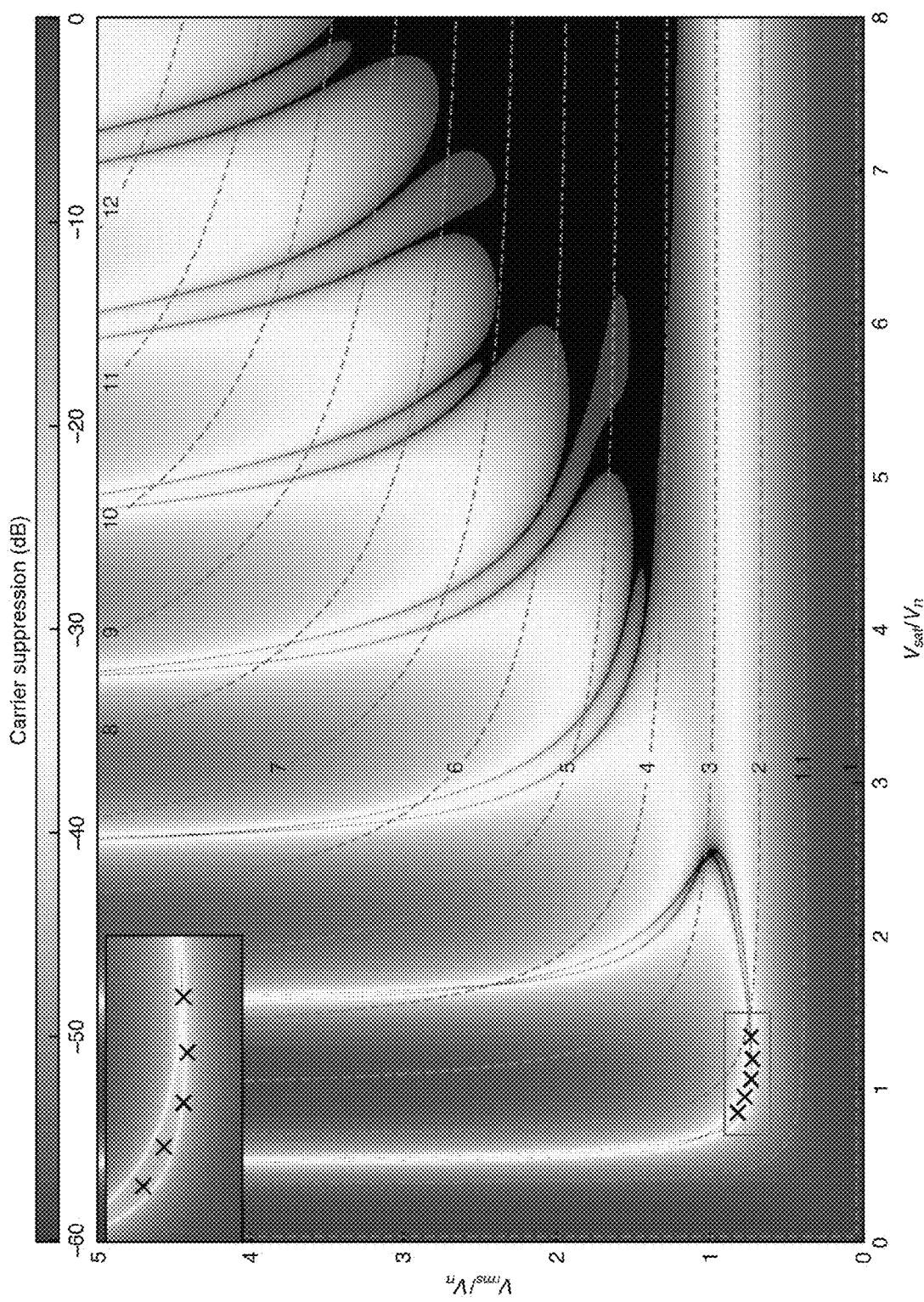
FIG. 3 is a plot of the calculated heat map of the carrier suppression $f_c$ as a function of $V_{rms}/V_\pi$ and $V_{sat}/V_\pi$.

FIG. 3 is a plot of the calculated heat map of the carrier suppression $f_c$ as a function of $V_{rms}/V_\pi$ and $V_{sat}/V_\pi$. The dependence of the carrier suppression on $V_{rms}$ and $V_{sat}$ of FIG. 3 was calculated by numerically solving Eq. (7) for the values of G, $x_a$, and $x_b$, measured for the last amplifier of FIG. 1, and the average voltage $\mu$ of the input voltage to the last amplifier of FIG. 1. The x axis and y axis represent the dimensionless ratios $V_{sat}/V_\pi$ and $V_{rms}/V_\pi$, respectively. FIG. 3 shows that regions with $V_{rms}/V_\pi$ below 0.66 and/or $V_{sat}/V_\pi$ below 0.46 have poor carrier suppression (e.g., −20 dB and above), with the bottom left of the plot indicating no carrier suppression in the absence of modulation. Regions having excellent carrier suppression (e.g., −60 dB and below) include maximum suppression in thin, distorted, U-shaped (e.g., horseshoe-shaped) bands (multiple bands are shown in FIG. 3 for ratios up to $V_{sat}/V_\pi$ equal to 7; more exist for larger ratios of $V_{sat}/V_\pi$ than shown in FIG. 3).

When $V_{rms} \gg V_{sat}$ (see, top left of FIG. 3), the random voltage applied to the EOM 120 has a high probability of exceeding $\pm V_{sat}/G$, and the at least one amplifier 140 is almost always saturated. In the limit of extreme saturation, all the area in the PDF is in the two side lobes, which can be approximated as delta functions at $\pm V_{sat}$ (i.e., $P(V_N) = (\delta(V - V_{sat}) + \delta(V + V_{sat}))/2)$. Substituting this equation in Eq. (7) yields $f_c = (1 + \cos(2\pi V_{sat}/V_\pi)/2$ (in agreement with J. Chamoun and M. J. F. Digonnet, "Pseudo-random-bit-sequence phase modulation for reduced errors in a fiber optic gyroscope," Opt. Lett., vol. 41, no. 24, pp. 5664-5667, December 2016, after recognizing that Chamoun 2016 defines $V_{sat}$ as a peak-to-peak value, whereas $V_{sat}$ as defined herein is an amplitude, resulting in an additional factor of 2 in front of the $\pi$ in this equation), and describes the periodic structure along the top of FIG. 3. When $V_{rms} \ll V_{sat}$ (see, bottom right of FIG. 3), the PDF is approximately Gaussian. Inserting a Gaussian into Eq. (7) yields $f_c = \exp(-(\pi V_{rms}/V_\pi)^2)$ (in agreement with Vikram 2019, Abramson 1963, Middleton 1996, Chamoun 2016, Godone 2008), and this expression describes the roll-off into a wide region of excellent carrier suppression when $V_{rms}$ is sufficiently large (e.g., $V_{rms}/V_\pi \gg 1$, at the far right of FIG. 3).

The dashed curves in FIG. 3 are contours of equal broadening. Each contour is labeled by a number equal to the ratio of the rms bandwidth of the broadened light to the rms electrical bandwidth of the noise voltage at the EOM 120. The model used to generate these contour lines is presented in the Appendix. These curves show that except for a very low $V_{rms}$ or $V_{sat}$ (which hardly ever occurs in practice), this ratio is larger than 1: the broadened light is broader than the noise signal. As $V_{sat}$ and $V_{rms}$ are both increased, this ratio increases. For example, along the curve labeled "4," if the amplifier chain has a bandwidth of 10 GHz the broadened laser has a bandwidth of 40 GHz. A 40-GHz optical bandwidth is achieved with only 10-GHz electronics, which represents a significant saving in complexity and cost.

In certain implementations, a finite power budget or thermal considerations limit the practical maximum value of $V_{rms}$. The operating points that use the least power while suppressing the carrier (e.g., completely or perfectly; by at least −30 dB; by at least −35 dB; by at least −40 dB; by at least −50 dB; by at least −60 dB) are along the bottom of the first band in FIG. 3 (e.g., $V_{sat}/V_\pi$ greater than 0.50 and less than or equal to about 2.57). This region has the lowest $V_{rms}$, but at the cost of tight tolerances in both $V_{rms}$ and $V_{sat}$, as shown by the narrow thickness of this first band. For example, for a $V_\pi$ of 4.7 V and a $V_{sat}$ of 6.3 V ($V_{sat}/V_\pi$=1.34, which falls in the first band), FIG. 3 shows that suppression of at least −30 dB can be achieved with $V_{rms}/V_\pi$=0.731±0.030, or $V_{rms}$=3.44±0.14 V. Operating in a higher order band can relax these tolerances, because these bands are much wider, as seen in FIG. 3. For example, $V_{sat}/V_\pi$=6 for a combination of a low-$V_\pi$ EOM (e.g., such as available from EOSPACE, Inc. of Redmond, Wash., with $V_\pi$<3.0 V at 1 GHz and $V_\pi$ degrading at higher frequencies to have an average $V_\pi$=3.5 V) and an amplifier (e.g., such as the ZHL-5W-202-S+ from Minicircuits of Brooklyn, N.Y., with a 3-dB compression point at 38 dBm, resulting in $V_{sat}$=~21 V). The carrier suppression of at least −30 dB can be achieved with $V_{rms}$=11.1±8.15 V (e.g., the tolerance can be about 58 times greater). Similarly, the tolerances for higher levels of carrier suppression (e.g., by at least −35 dB; by at least −40 dB; by at least −50 dB; by at least −60 dB) can be even greater for larger ratios of $V_{sat}/V_\pi$. A disadvantage can be that to reach these regions, large and expensive drives are used to achieve large values of $V_{sat}$.

Previous disclosures have only explored specific narrow slices of the parameter space of $V_{sat}/V_\pi$ and $V_{rms}/V_\pi$, and have not provided guidance regarding performance of an optical system (e.g., broadband laser 100) outside these specific slices (e.g., a vertical slice at $V_{sat}/V_\pi$=1.34 (Chamoun 2017); a vertical slice presumably in the range of 0.5<$V_{sat}/V_\pi$<1.5 (Anderson 2014)); a pseudo-random bit sequence (PRBS) signal driving the EOM, which is effectively a horizontal slice at $V_{rms}/V_\pi$=∞ with the values of $V_{sat}$ determined by the amplitude of the PRBS signal (Anderson 2014; Chamoun 2016)). These previous disclosures were based on empirical observations and did not utilize accurate modeling (e.g., that included the effects of saturation) that would lead to the structures and methods of certain implementations described herein.

Certain implementations described herein avoid operation in certain regions of the parameter space of $V_{sat}/V_\pi$ and $V_{rms}/V_\pi$. For example, for any white noise voltage $v_n(t)$ input into the final amplifier 146, the broadband laser 100 can be configured to avoid operation in a region in which no values of $V_{rms}$ completely suppress the carrier (e.g., $V_{sat}/V_\pi$ less than 0.5). As another example, for a $V_{sat}/V_\pi$ of 2.57, perfect carrier suppression can be attained with $V_{rms}/V_\pi$=0.98. If the $V_{sat}$ value of the amplifier is increased by 10% such that $V_{sat}/V_\pi$=2.83, the minimum $V_{rms}/V_\pi$ that provides perfect carrier suppression is now more than doubled, to about 2.65. Further increasing $V_{sat}/V_\pi$ reduces the $V_{rms}/V_\pi$. Nevertheless, $V_{rms}/V_\pi$ still disadvantageously remains large (e.g., greater than 2.0) in this region of 2.28<$V_{sat}/V_\pi$<3.08. In the limit of amplifiers where the gain compression sets in suddenly (e.g., $x_b$=−$x_a$=1, see bottom of FIG. 16), there exists a region between $V_{sat}/V_\pi$≈1.67 and 2.5 where no value of $V_{rms}$ perfectly suppresses the carrier. The existence of these regions of the parameter space to be avoided for operation of the broadband laser 100 is surprising (e.g., not suggested by previous disclosures), insomuch as reducing the $V_{sat}/V_\pi$ (e.g., by using a less expensive final amplifier 146 with a reduced dynamic range, meaning lower $V_{sat}/V_\pi$; by attenuating the output of a high-dynamic-range amplifier 140) does allow for complete (e.g., perfect) carrier suppression for certain values of $V_{sat}/V_\pi$ and $V_{rms}/V_\pi$.

Certain implementations described herein utilize the structure of the carrier suppression in the parameter space of $V_{sat}/V_\pi$. For example, referring to FIG. 3, each of the U-shaped bands (e.g., corresponding to large carrier suppression) has a first prong, a bottom portion, and a second prong. Each first prong that starts exactly at $V_{sat}/V_\pi$=2n+0.5, where n is an integer. At these starting values of $V_{sat}/V_\pi$, the carrier suppression is optimal at large values of $V_{rms}$ (e.g., $V_{rms}$=∞; $V_{rms}$ greater than or equal to 5). The first prongs of these U-shaped bands split into two as they extend downward, with values of $V_{rms}$ that initially decrease with increasing $V_{sat}$, to the bottom portion which includes a region comprising a minimum $V_{rms}$, from which the values of $V_{rms}$ in the bottom portion increase with increasing $V_{sat}$. The second prong of each U-shaped band veers to the right past $V_{sat}/V_\pi$=(2n+1.5), then extends upward, and curves to the left, with values of $V_{rms}$ that increase as $V_{sat}/V_\pi$ gradually decreases towards (2n+1.5). In certain implementations, the optical system (e.g., broadband laser 100) is operated at or near the bottom portion of the second U-shaped band (e.g., with $V_{sat}/V_\pi$ in a range of 2.5 to 6.5 and $V_{rms}/V_\pi$ in a range of 0.8 to 2.4) or at or near the bottom portion of one of the third or higher.

Certain implementations described herein utilize the widths of the first and second prongs and the bottom portions of these U-shaped bands over which the carrier is optimally suppressed (e.g., better than −30 dB; better than −35 dB; better than −40 dB; better than −50 dB; better than −60 dB; completely; perfectly). These widths correspond to the tolerances at which $V_{sat}$ and $V_{rms}$ are to be maintained to keep the carrier suppression substantially better than a predetermined threshold (e.g., better than −30 dB, better than −40 dB, better than −50 dB, better than −60 dB). As shown in FIG. 3, these widths vary depending on the location of the operating point along the U-shaped band. For example, the width of the band at the right-hand side of each U-shaped band (e.g., for ($V_{sat}/V_\pi$; $V_{rms}/V_\pi$)=(2.57, 0.98), ($V_{sat}/V_\pi$, $V_{rms}/V_\pi$)=(5.0, 1.5) in FIG. 3) is greater than the width of the band at the left-side of the U-shaped band (e.g., ($V_{sat}/V_\pi$, $V_{rms}/V_\pi$)=(0.84, 0.81), ($V_{sat}/V_\pi$, $V_{rms}/V_\pi$)=(3.20, 1.82)). In certain implementations, the optical system (e.g., broadband laser 100) is operated at values of $V_{sat}$ at which the widths are larger, and hence where the tolerances in $V_{sat}$ and in $V_{rms}$ are less restrictive, allowing for optimal suppression to be achieved over a range of operating temperatures and with looser fabrication tolerances of the at least one amplifier 140 and/or the EOM 120.

As shown in FIG. 3, the widths of the bottom portions of the U-shaped bands are larger for U-shaped bands with higher n than those with smaller n such that there is a large continuous region in the parameter space for which the carrier is suppressed (e.g., better than −30 dB; better than −35 dB; better than −40 dB; better than −50 dB; better than −60 dB; completely; perfectly). For example, the optical system (e.g., broadband laser 100) can be operated at values of $V_{sat}/V_\pi$ greater than or equal to 4 and at values of $V_{rms}/V_\pi$ greater than or equal to 1.2.

Example FOG Configurations

Figure 4:
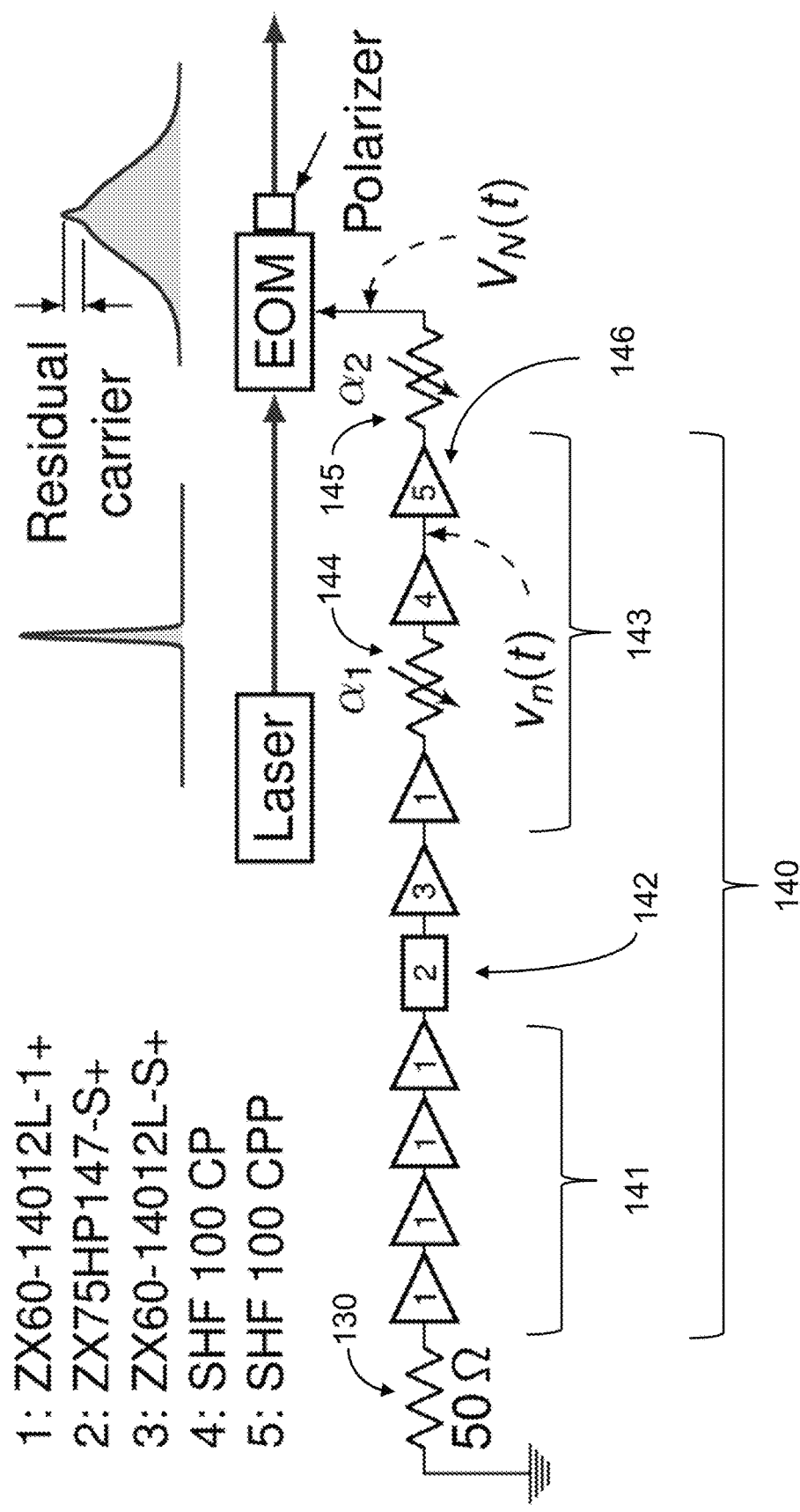
FIG. 4 schematically illustrates an example noise source and at least one amplifier compatible with certain implementations described herein.

FIG. 4 schematically illustrates an example noise source 130 and at least one amplifier 140 compatible with certain implementations described herein. The noise source 130 and the at least one amplifier 140 of FIG. 4 can be used to amplify 14 GHz of thermal noise to 28 dBm of input power to the EOM 120 (e.g., the noise bandwidth is determined by the bandwidth of the amplifiers). A broadened laser 100 comprising the noise source 130 and the at least one amplifier 140 of FIG. 4 was used to experimentally verify the dependence of the carrier suppression on the $V_{rms}$ and $V_{sat}$ parameters. The noise source 130 comprises at least one resistor (e.g., a 50-Ω resistor) that generates thermal noise and the at least one amplifier 140 comprises a first set of amplifiers 141 (e.g., a series of preamplifiers and amplifiers) configured to receive and amplify the thermal noise. The at least one amplifier 140 further comprises a high-pass filter (HPF) 142 configured to remove $1/f$ noise near DC from the amplified thermal noise outputted by the first set of amplifiers 141. The at least one amplifier 140 further comprises a second set of amplifiers 143 configured to receive the output of the HPF 142. The at least one amplifier 140 further comprises a first variable attenuator 144 (with attenuation $\alpha_1$) configured to adjust $V_{rms}$ (e.g., to adjust the shape of the PDF applied to the EOM 120). The at least one amplifier 140 further comprises a second variable attenuator 145 (with attenuation $\alpha_2$) configured to receive voltage from a final amplifier 146 of the at least one amplifier 140 and to adjust both $V_{rms}$ and $V_{sat}$. The first variable attenuator 144 can be positioned between two or more of the amplifiers of the second set of amplifiers 144 (e.g., before the last two amplifiers of the second set of amplifiers 143, as schematically illustrated by FIG. 4) and the second variable attenuator 146 can be positioned after the second set of amplifiers 144 (e.g., at the end of the at least one amplifier 140, as schematically illustrated by FIG. 4). In certain other implementations, the first variable attenuator 144 can be positioned between the second set of amplifiers 143 and the second variable attenuator 145.

When a FOG is interrogated with a narrow-linewidth laser, it suffers from significant drift induced by scatterers in the FOG's sensing fiber coil, which form many distributed spurious interferometers (see, e.g., Lloyd 2013). This drift is proportional to the power in the residual carrier. When the narrow-linewidth laser is broadened, the power in the residual carrier decreases, which reduces this drift (see, e.g., Chamoun 2017). Thus, the carrier suppression can be inferred by comparing the measured drift of a FOG interrogated with a broadened laser and an unbroadened laser.

Certain implementations described herein utilize an EOM that has a $V_\pi$ that is not isotropic (e.g., a birefringent crystal where light polarized along the extraordinary and ordinary axes experience a different V value). Thus, for the same applied voltage distribution $P(V_N)$, one of the fields can exhibit excellent carrier suppression and the other can exhibit a poorer suppression, which can spoil the overall carrier suppression of the broadened laser. To address this issue, the EOM of certain implementations can be configured to achieve a substantially isotropic $V_\pi$ (e.g., via careful design of the waveguide and electrode geometry), or the undesired field can be blocked (e.g., in the case of a birefringent EOM, with a polarizer at the output that allows only the desired polarization to be output from the EOM; using a polarized source and polarization-maintaining fibers).

Figure 5:
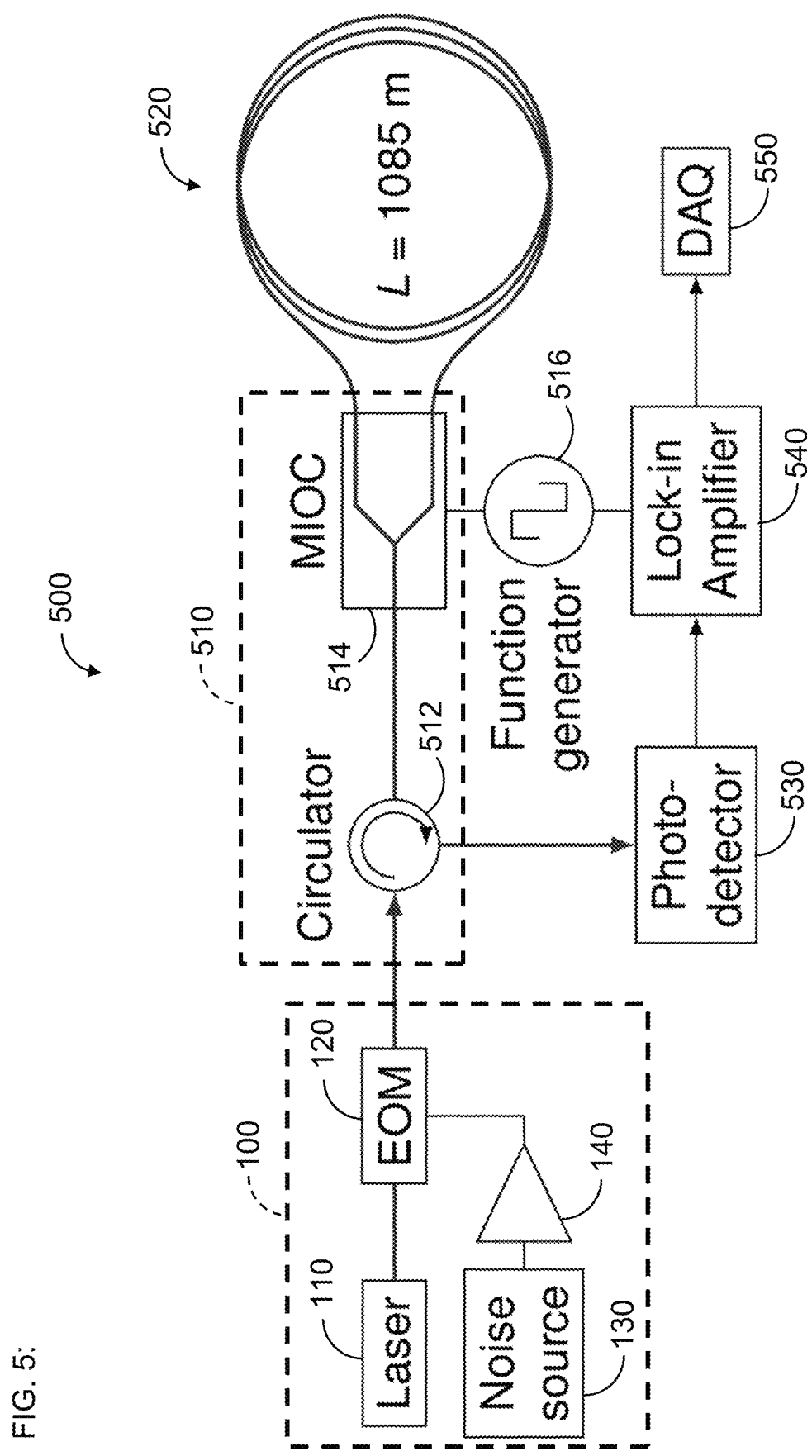
FIG. 5 schematically illustrates an example FOG in accordance with certain implementations described herein.

FIG. 5 schematically illustrates an example FOG 500 in accordance with certain implementations described herein that is configured to measure coherence suppression. The FOG 500 comprises the broadened laser 100 which comprises a narrow-linewidth laser 110 (e.g., Orbits Ethernal laser having a linewidth of about 90 Hz) and an electro-optic phase modulator (EOM) 120 (e.g., iXBlue MPZ-LN-10 phase modulator) configured to receive the laser light from the laser 110 and to receive (e.g., to be driven by) amplified noise from the at least one amplifier 140 (see, e.g., FIG. 4). The EOM 120 is configured to output broadened light. The FOG 500 further comprises an optical circuit 510, a fiber coil 520, a photodetector 530, a lock-in amplifier 540, and a digital acquisition circuitry 550. The optical circuit 510 comprises a circulator 512 configured to receive the broadened light from the broadened laser 100 and a multi-function integrated-optic circuit (MIOC) 514 configured to receive at least a portion of the broadened light from the circulator 512, to polarize the received broadened light, to split the received broadened light power into two evenly split signals, to apply a square-wave modulation (e.g., from a function generator 516) to the two evenly split signals (e.g., to bias the interferometer for maximum signal-to-noise ratio), and to provide the evenly split and modulated signals into two corresponding inputs of the fiber coil 520. The MIOC 514 is further configured to receive and recombine two signals returning from the fiber coil 520. The circulator 512 is further configured to receive and direct the recombined signals to the photodetector 530. The photodetector signal is demodulated by the lock-in amplifier 540, and the output of the lock-in amplifier 540 is measured with the digital acquisition (DAQ) circuitry.

Figure 6:
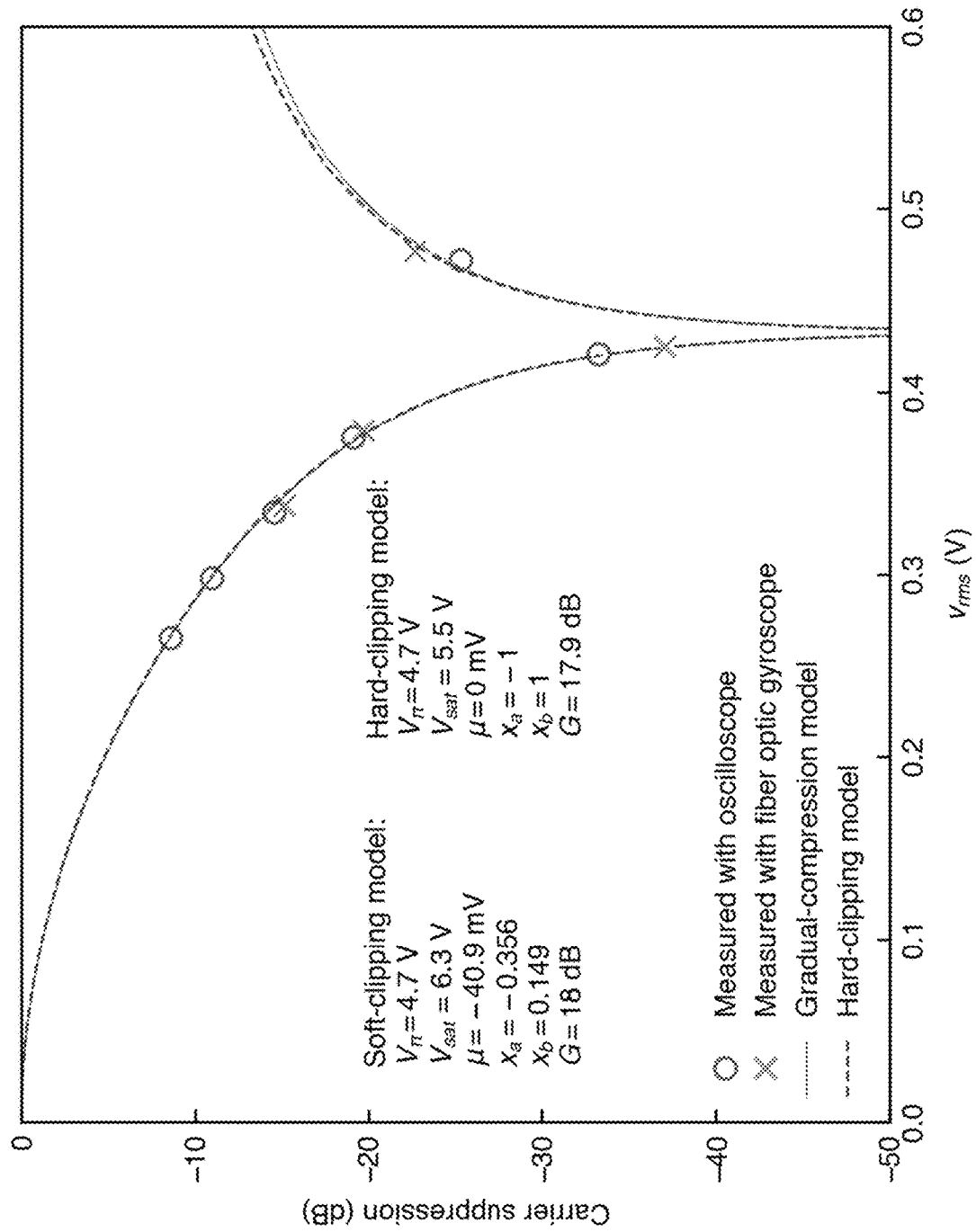
FIG. 6 is a plot of the $f_c$ values as a function of $V_{rms}/V_\pi$ in accordance with certain implementations described herein.

The carrier suppression of the broadened laser was measured by recording the output signal of the FOG 500 for a few minutes, calculating the Allan variance of this temporal trace, and inferring the noise (angular random walk) form the Allan variance. The FOG measurements were made first with the unbroadened laser 110, then with the broadened laser 100 using the laser 110 with various attenuations al to vary $f_c$. FIG. 6 is a plot of the $f_c$ values as a function of $V_{rms}/V_\pi$ in accordance with certain implementations described herein. The dashed line of FIG. 6 denotes the $f_c$ values calculated using the mathematical model presented herein, the dots of FIG. 6 denote the experimental reduction in drift in a fiber optic gyroscope, and the circles of FIG. 6 denote the coherence reduction inferred from the PDF measured with an oscilloscope. To accommodate some uncertainty in the absolute value of $V_{rms}$ (e.g., loss due to RF connectors), the measured $V_{rms}$ values were shifted by about 0.2 dB to align the data to the theory. As previously observed experimentally (see, e.g., Anderson 2014; Chamoun 2017), as $V_{rms}$ is increased, the carrier suppression improves until it reaches a minimum at about $0.72V_\pi$, then with further increases of $V_{rms}$, the carrier suppression degrades, with the most suppression measured to be −37 dB (see dots in FIG. 6).

FIG. 6 also shows this dependence confirmed by measurements using a different method. The PDF $P(V_N)$ of the noise voltage generated by the circuit of FIG. 4 was measured for different values of $V_{rms}$ (which was adjusted by varying $\alpha_1$ and holding as constant) using a wide-bandwidth oscilloscope (e.g., Agilent 86100A). Eq. (7) was then used to calculate $f_c$ from each $P(V_N)$, and $f_c$ was plotted as a function of $V_{rms}$ (dots in FIG. 6). As seen in FIG. 6, the two sets of experimentally measured values are in excellent agreement with one another.

FIG. 6 also shows (dashed line) the carrier suppression modeled using Eqs. (7), (8), (10), and (11). There is excellent agreement between the modeled and measured carrier suppression dependencies on $V_{rms}$. This comparison also confirms that the minimum in the carrier suppression arises strictly from saturation of the amplifiers. Without the amplifier saturation, the carrier suppression would keep improving as $V_{rms}$ is increased (see, e.g., Chamoun 2016). Saturation does have a benefit though. In the absence of saturation, the noise PDF is purely Gaussian, and using Eq. (7), the carrier extinction can be shown to become infinite only in the limit of infinite $V_{rms}$. In the presence of saturation, it can also be shown with Eq. (7) that the carrier extinction becomes infinite for a finite $V_{rms}$. The shape of the PDF therefore influences greatly the carrier suppression. This shape can be controlled with an amplifier, as described herein, or with other nonlinear filters (e.g., a network of transistors; a network of diodes and resistors).

The minimum of the dashed curve in FIG. 6 corresponds to a point near the bottom of the first band in FIG. 3. To confirm the shape of this band experimentally, $V_{rms}$ and $V_{sat}$ were varied by adjusting $\alpha_1$ and $\alpha_2$. The combinations of $V_{rms}$ and $V_{sat}$ that minimized the bias instability in the FOG 500, and therefore the local minima in $f_c$, are shown as crosses in FIG. 3, and they agree very well with the theoretical bands.

Figure 13:
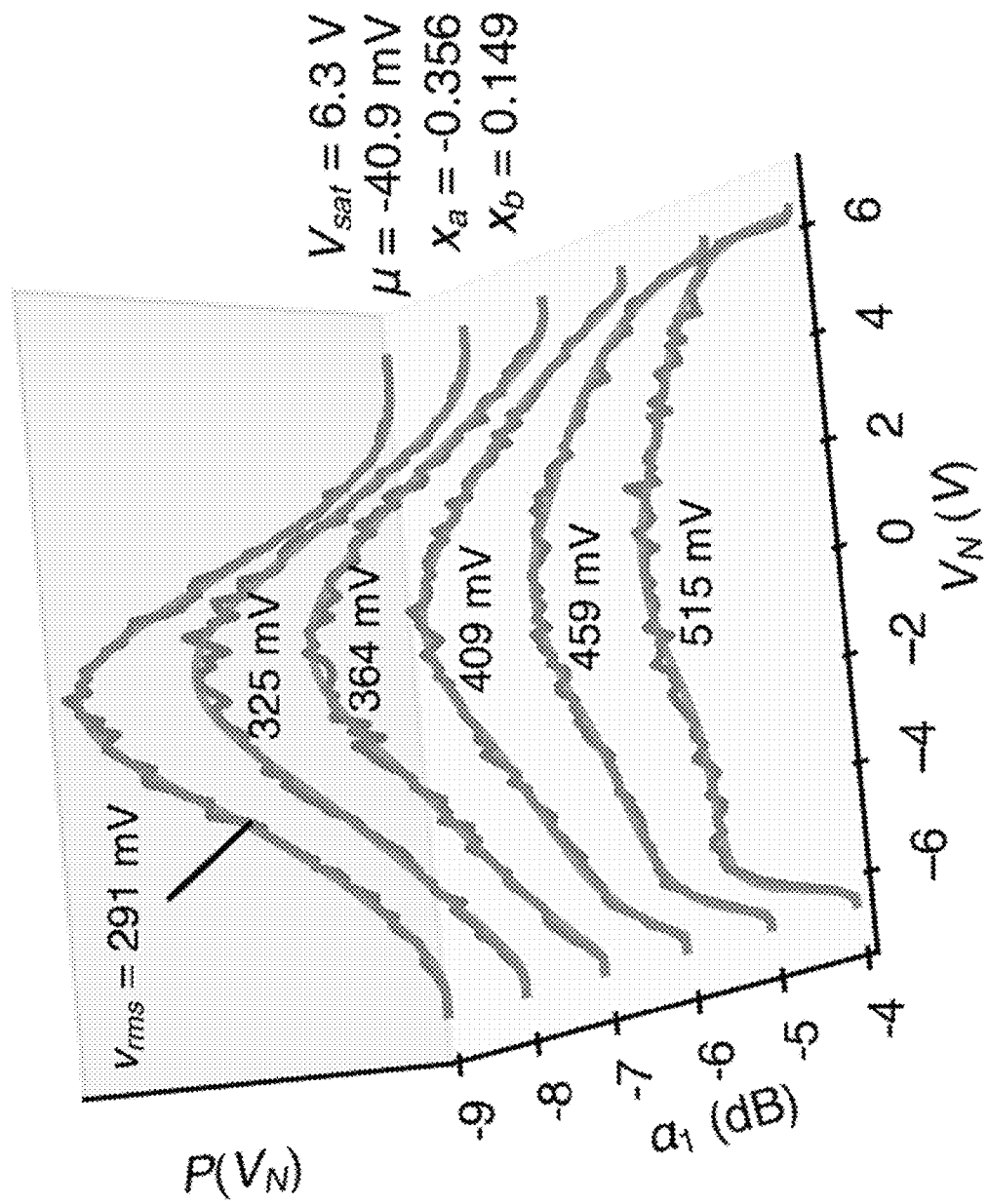
FIG. 13 shows the PDF of the output signal g(y) or $V_N(t)$ measured using the noise source schematically illustrated in FIG. 4 in accordance with certain implementations described herein.

FIG. 13 is a plot of the measured and modeled probability density functions $P(V_N)$ for several values of the variable attenuation $\alpha_1$ while keeping as =0 dB in accordance with certain implementations described herein. When $\alpha_1$ is −9 dB and as =0 dB (see top of FIG. 13), the two amplifiers after the first variable attenuator 144 of FIG. 4 are not saturated, and the PDF is approximately Gaussian. When $\alpha_1$ is −4 dB (see bottom of FIG. 13), at least one of the two amplifiers after the first variable attenuator 144 of FIG. 4 is driven into saturation, resulting in a measured PDF that is no longer Gaussian but is flatter and exhibits shoulders. FIG. 13 also plots the PDF calculated using the method of FIG. 12. The expected and measured PDFs are in good agreement.

In certain implementations, operating in the second U-shaped band of FIG. 3 (e.g., n=1) is advantageous because in that region, the carrier suppression is less sensitive to variations in $V_{sat}$ and $V_{rms}$. To reach that band, the electronics and the EOM 120 satisfy $V_{sat}/V_\pi>3.5$ (see FIG. 3). To achieve a ratio of 3.5 or greater, certain implementations described herein utilize an EOM 120 fabricated in a longer electro-optic crystal to reduce $V_\pi$ and/or an amplifier that can supply larger voltages to increase $V_{sat}$. Both enhancements come at the cost of a reduced noise bandwidth, which reduces the bandwidth of the broadened laser.

Commercial high-bandwidth fiber-pigtailed EOMs are fabricated in LiNbO$_3$ and typically have an electro-optic crystal length of a few centimeters in length. For example, a low-$V_\pi$ compact modulator available from EOSPACE, Inc. of Redmond Wash. has a crystal length of 8.8 cm, an insertion loss of 10 dB, and a $V_\pi$ of 3 V at 1 GHz. For another example, a MPZ-LN-10 modulator available from iXBlue of Saint-Germain-en-Laye, France has a length of 8.5 cm, an insertion loss of 2.5 dB, and a $V_\pi$ of 4 V at 1 GHz). The electro-optic efficiency is the strongest (e.g., and the $V_\pi$ is the lowest) for low frequencies, and the electro-optic efficiency degrades at higher RF frequencies. Using a longer crystal increases the electro-optically active area (e.g., reducing $V_\pi$ by half when the length is doubled), albeit at the cost of increasing the loss and a larger footprint.

Figure 7:
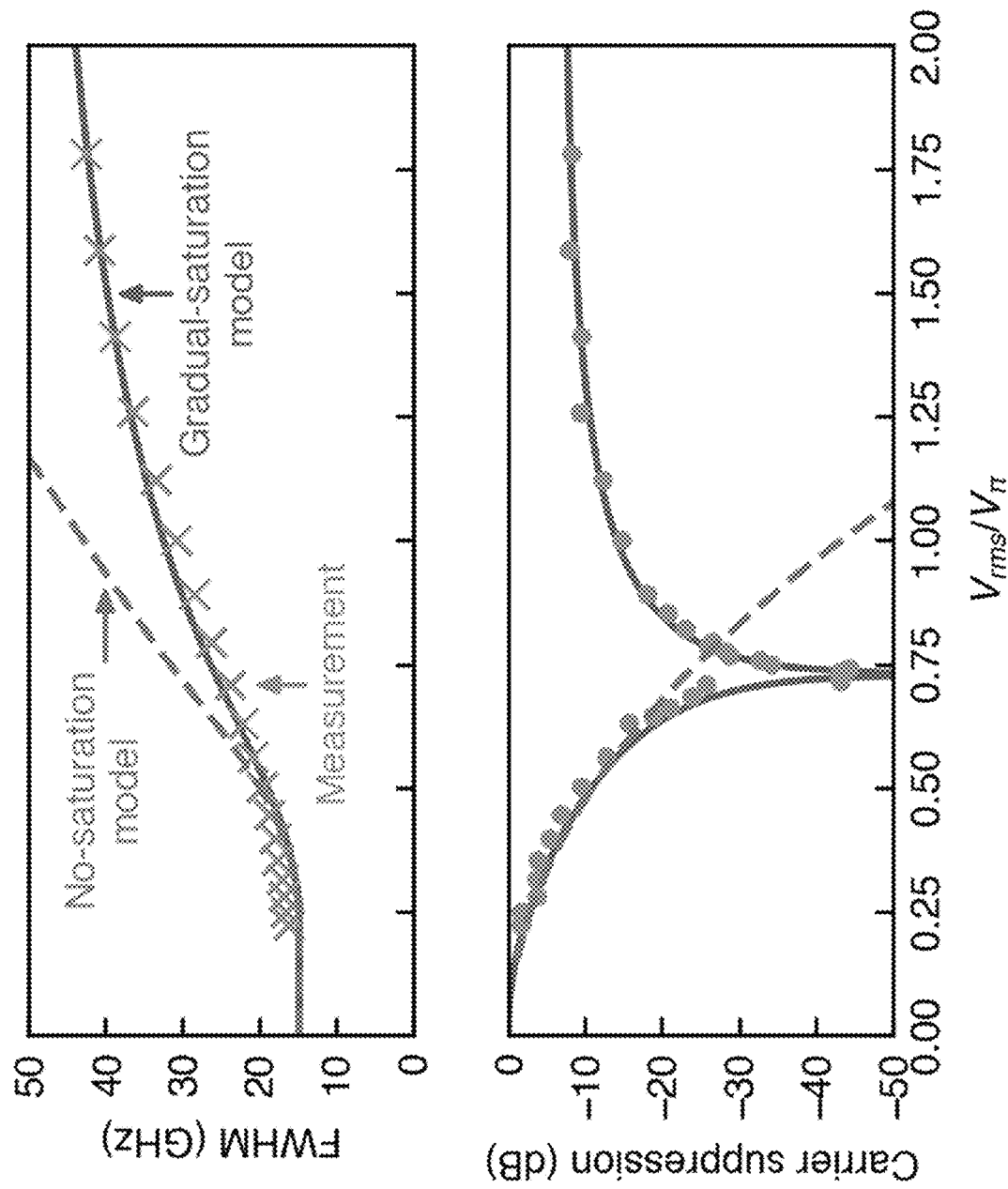
FIG. 7 is a plot of measured full width at half maximum (FWHM) and the measured carrier suppression of a broadened laser along with calculated predictions of the dependencies of the FWHM and carrier suppression as functions of $V_{rms}/V_\pi$ as described herein.

FIG. 7 is a plot of the measured full width at half maximum (FWHM) and the measured carrier suppression of a broadened laser along with calculated predictions of the dependencies of the FWHM and carrier suppression as functions of $V_{rms}/V_\pi$, as described herein. The broadened laser was previously used with a different noise source to measure the dependence of the FWHM on $V_{rms}$ (see, e.g., Chamoun 2017). The laser 110 was a RIO laser with a 2-kHz linewidth, the noise source 130 was an NW10-G noise source from NoiseWave of Whippany, N.J. (about 10-GHz bandwidth) amplified by at least one amplifier 140 comprising: three Minicircuits ZX60-14012L preamplifiers, attenuated by a factor cu, and amplified with an SHF 100 CP amplifier. Model parameters are based on device parameters as listed by the vendor. In the measurements of FIG. 7, the amplifier 140 did not include a high-pass filter.

The carrier suppression and FWHM were estimated by fitting the measured broadened spectrum to a Gaussian. The solid and dashed curves of FIG. 7 were determined by the model of FWHM in the Appendix. The solid curve was generated with $V_{sat}$ equal to 6.3 V. The dashed curve illustrates the hypothetical dependence under the assumption of no saturation (e.g., $V_{sat}$ equal to infinity). The dependencies calculated using $V_{sat}$ equal to 6.3 V agree quite well with the measured behavior of the carrier suppression, and with the monotonically increasing FWHM as $V_{rms}$ is increased. Comparison of the two theoretical curves in the top graph of FIG. 7 shows that the increase in linewidth is slowed down by saturation. Comparison of the two theoretical curves in the bottom graph of FIG. 7 shows that a −40-dB suppression can be achieved using a much lower $V_{rms}$ with saturation than without saturation.

Example Implementations Using a Soft-Clipping Amplifier

In general, the parameters that determine the precise shape of these functions, namely $x_a$, $x_b$, and $V_{sat}$, are unknown and will be unique for each amplifier model. These parameters can be empirically determined (e.g., by applying Gaussian white noise with various standard deviations to the input of the amplifier and measuring the output of the amplifier with a high-speed oscilloscope). For example, FIG. 13 shows the PDF of the output signal $V_N(t)$ measured using the noise source schematically illustrated in FIG. 4 in accordance with certain implementations described herein. The standard deviation of the input noise was adjusted by varying the applied attenuation $\alpha_1$ and holding as at a constant known value, resulting in an effective standard deviation $v_{rms}=v_{rms,0}\cdot 10(\alpha_1/20)$, where $v_{rms,0}$ is the standard deviation of the applied input noise with no attenuation. The output $V_N(t)$ was measured with a high-speed oscilloscope resulting in the PDFs shown in the dashed lines in FIG. 13. The parameters $\mu$, $v_{rms,0}$, $x_a$, $x_b$, and $V_{sat}$ were determined by a least-squares fitting technique, and the values of best fit are shown in Table 1.

TABLE 1

Coefficients of best fit for the transfer function of the SHF 100 CPP amplifier.

| Parameter | Value |
| --- | --- |
| $\mu$ | −40.9 mV |
| $v_{rms,0}$ | 767 mV |
| $X_a$ | −0.355 |
| $X_b$ | 0.148 |
| $V_{sat}$ | 6.3 V |
| G | 18 dB |

The values in Table 1 indicate various properties of the SHF 100 CPP amplifier, and the rest of the at least one amplifier 140 schematically illustrated in FIG. 5. The values of $x_a$ and $x_b$ indicate that the amplifier is approximately linear over about 25% of its output range, and that nonlinearities begin for positive voltages at lower absolute values than the nonlinearities beginning for negative voltages. The non-zero value of $\mu$ indicates that either the input noise has a non-zero mean, or the bias point of the amplifier is not centered at the middle of the possible output range. These two effects contribute to an asymmetry in the output PDF.

Figure 14:
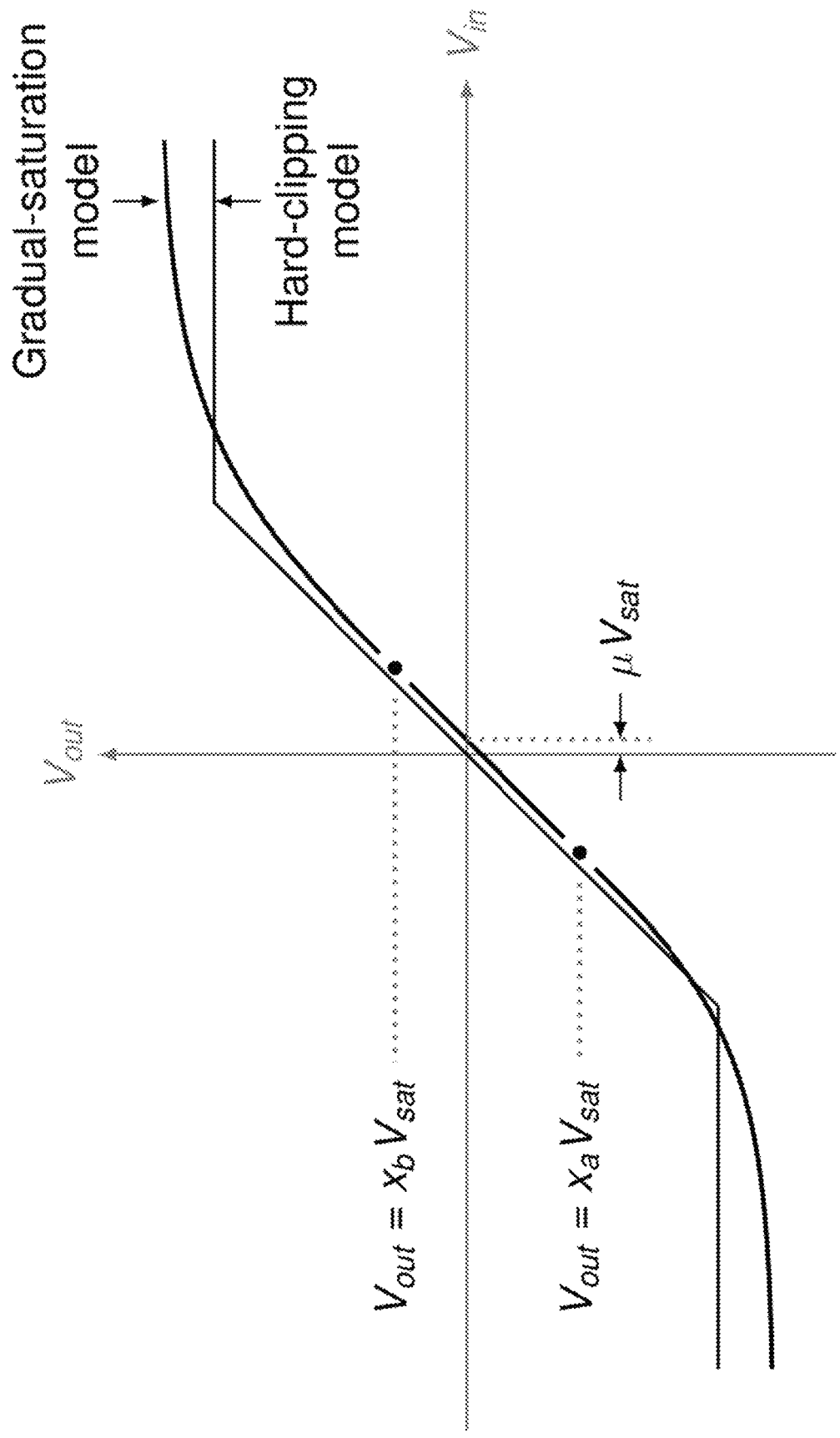
FIG. 14 schematically illustrates the gradual-saturation model amplifier transfer function defined by certain parameter values and a hard-clipping model amplifier transfer function having hard rails in accordance with certain implementations described herein.

FIG. 14 schematically illustrates the gradual-saturation model amplifier transfer function (dark line) defined by the parameter values of Table 1 and a hard-clipping model amplifier transfer function (e.g., $x_b=-x_a=1$) (light line) in accordance with certain implementations described herein. Two differences between the gradual-saturation amplifier transfer function and the hard-clipping amplifier transfer function can be seen in FIG. 14. First, for the hard-clipping model, the amplifier outputs zero volts for zero volts of input, while the gradual-saturation model (e.g., soft-clipping model) allows for an offset μ, due either to the input waveform not being centered at zero volts, or due to an intrinsic non-zero biasing point set by the fabrication of the amplifier (e.g., due to the gate-to-channel thickness in the FET or setting the bias point by capacitively coupling the input voltage into a voltage divider in the input stage with non-zero mean). Second, the hard-clipping model reaches its maximum absolute value (e.g., 5.5 V) at a lower value of $V_{in}$, and then stays clamped to the maximum absolute value for increasing input values. In contrast, the gradual-saturation value utilizes a larger value of $V_{in}$ to reach the $V_{sat}$ of the hard-clipping model, but for very large values of $V_{in}$, the amplifier is able to output values larger than the maximum absolute value of the hard-clipping model as the amplifier asymptotically approaches the $V_{sat}$ of the gradual-saturation model (e.g., 6.3 V).

The carrier suppression of a broadened laser 100 driven by the output of any amplifier (e.g., operating in accordance with the hard-clipping model or the gradual-saturation model) can be expressed using Eq. (7) described above.

FIG. 6 is a plot of the $f_c$ values as a function of $V_{rms}/V_\pi$ using the gradual-saturation model in accordance with certain implementations described herein. In FIG. 6, dots represent carrier suppressions inferred from the reduction in drift in a FOG, and the circles represent the carrier suppressions inferred by calculating the carrier suppression from the measured PDF. The solid line represents the modeled carrier suppression using a hard-clipping model with rails at 5.5 V and a gain of 17.9 dB, and the dashed line represents the modeled carrier suppression using the gradual-saturation model (e.g., soft-clipping model) with the parameters listed in Table 1. As seen in FIG. 6, the shape of either model agrees very well with the data. The primary difference between the two models in FIG. 6 is that the hard-clipping model predicts a single global minimum, whereas the gradual-saturation model predicts two local minima, separated by a very short distance (e.g., a relative difference of 0.3%) with a local maximum at −60 dB between the two minima. The fact that these two models agree so well implies that the carrier suppression dependence on $V_{rms}$ can be modeled well by more than one combination of $V_{sat}$, G, $x_a$, and $x_b$. For example, in certain implementations, the number of free parameters can be reduced, thereby simplifying the model, by setting the parameters of the gradual-saturation model to: $x_b=-x_a=1$ to approximate the hard-clipping model, and determining the value of $V_{sat}$ that describes the measured data.

Figure 15:
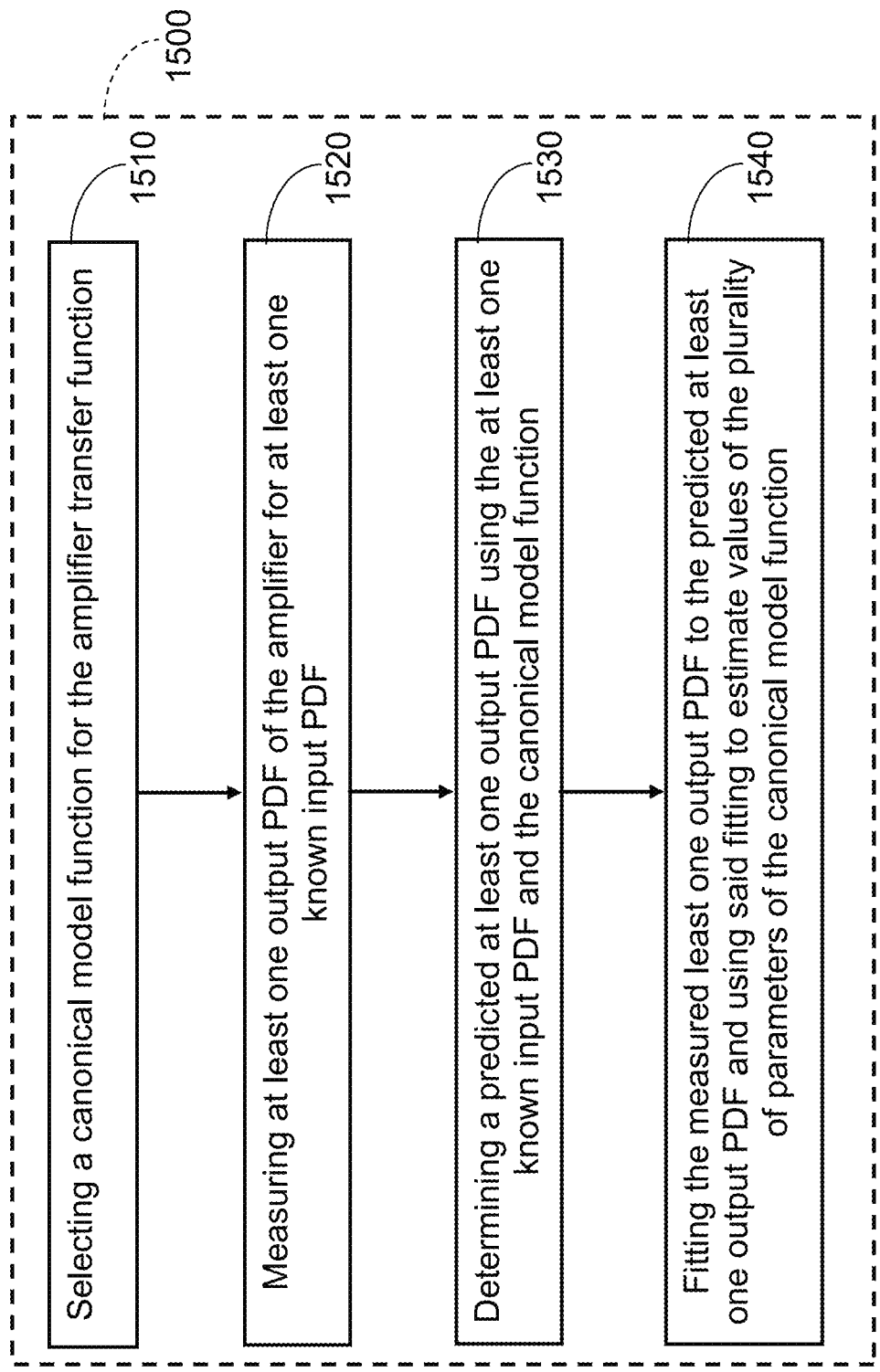
FIG. 15 is a flow diagram of a method for predicting the carrier suppression for an amplifier transfer function in accordance with certain implementations described herein.

FIG. 15 is a flow diagram of a method 1500 for predicting the carrier suppression for an amplifier transfer function in accordance with certain implementations described herein. In an operational block 1510, the method 1500 comprises selecting a canonical model function for the amplifier transfer function, the canonical model function having a plurality of parameters. In an operational block 1520, the method 1500 further comprises measuring at least one output PDF of the amplifier for at least one known input PDF. In an operational block 1530, the method 1500 further comprises determining (e.g., calculating) a predicted at least one output PDF using the at least one known input PDF and the canonical model function. In an operational block 1540, the method 1500 further comprises fitting the measured at least one output PDF to the predicted at least one output PDF and using said fitting to estimate values of the plurality of parameters of the canonical model function. Using the method 1500, certain implementations predict the carrier suppression for any input $V_{rms}$ by generating the PDF at that value of $V_{rms}$ and calculating the $f_c$ so as to determine the minimum carrier suppression.

Figure 16:
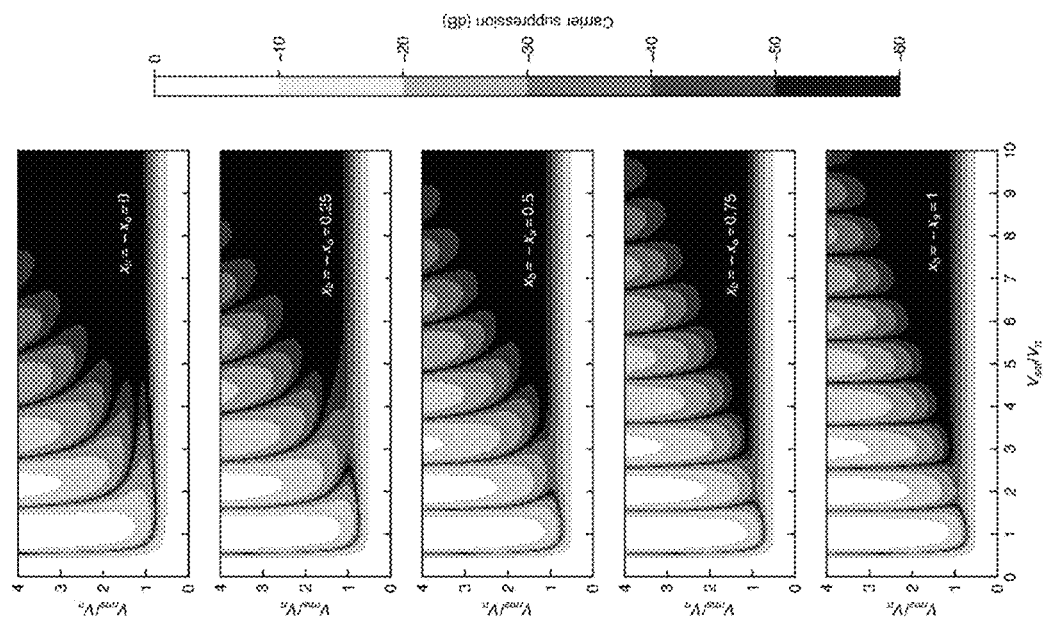
FIG. 16 shows graphs of the example carrier suppression as a function of $V_{sat}$ and $V_{rms}$ for four different choices of $x_a = -x_b$ while holding $\mu=0$ in the gradual-saturation model and a graph of the carrier suppression as a function of $V_{sat}$ and $V_{rms}$ for the hard-clipping model (e.g., $x_b = -x_a = 1$) in accordance with certain implementations described herein.

FIG. 16 shows graphs of the example carrier suppression as a function of $V_{sat}$ and $V_{rms}$ for four different choices of $x_a=-x_b$ while holding μ=0 in the gradual-saturation model and a graph of the carrier suppression as a function of $V_{sat}$ and $V_{rms}$ for the hard-clipping model (e.g., $x_b=-x_a=1$) in accordance with certain implementations described herein. FIG. 16 is illustrative of the dependence of the carrier suppression on the upper and lower limits of the linear regime of the amplifier transfer function.

For example, several properties of the carrier suppression's dependence on $V_{rms}$ and $V_{sat}$ are not dependent on the value of $x_b$. In the region of $V_{rms} \gg V_{sat}$ (e.g., along the top of each graph of FIG. 16), the carrier suppression is periodic with increasing $V_{sat}$. In the region of $V_{sat} \gg V_{rms}$, the carrier suppression decays approximately exponentially into a region of excellent carrier suppression. In the region of $V_{sat}/V_\pi$ less than or equal to about 2, the values of $V_{rms}$ that optimally suppress the carrier form a U-shaped band. As previously discussed, the carrier suppression dependence on $V_{rms}$ in this first U-shaped band can be accurately modeled by more than one combination of $V_{sat}$, $x_a$, and $x_b$.

For each of the graphs of FIG. 16, in the region of $V_{sat}/V_\pi$ greater than 2.5, the carrier suppression is better than −40 dB in an approximately triangular region. For example, for the hard-clipping model (e.g., $x_b=-x_a=1$), this triangular region has a lower bound at $V_{rms}/V_\pi$ greater than or equal to 0.75 and an upper bound at $V_{rms}/V_\pi$ less than or equal to 0.4. $V_{sat}/V_\pi$. For the carrier suppressions shown in the graphs for the gradual-saturation model, the slope of the upper bound of the triangular region increases with decreasing $x_b$.

As seen in FIG. 16, the bottom portion of the first U-shaped band widens and the second prong of the first U-shaped band shifts to the right by reducing the limits of the linear regime. In certain implementations, this dependence of the first U-shaped band on the extent of the linear range of the amplifier transfer function can be used to design a broadened laser with $V_{rms}$ approximately equal to V and an arbitrary $V_{sat}$ greater than or equal to 1.6 $V_\pi$ by limiting the linear range of the amplifier transfer function of the final amplifier 146 to the appropriate range. In certain implementations, the properties of the carrier suppression shown in FIG. 16 can be used to design a broadened laser (e.g., to select parameters for operation) such that the operating point of the amplifier is robust to variations in $V_{rms}$, $V_{sat}$, $V_\pi$, $x_a$, $x_b$, and μ. For example, such a broadened laser can mitigate variations in carrier suppression caused by aging, variations in temperature, and/or part-to-part manufacturing variations of the amplifier.

Carrier Suppression at Multiple Wavelengths

Figure 8:
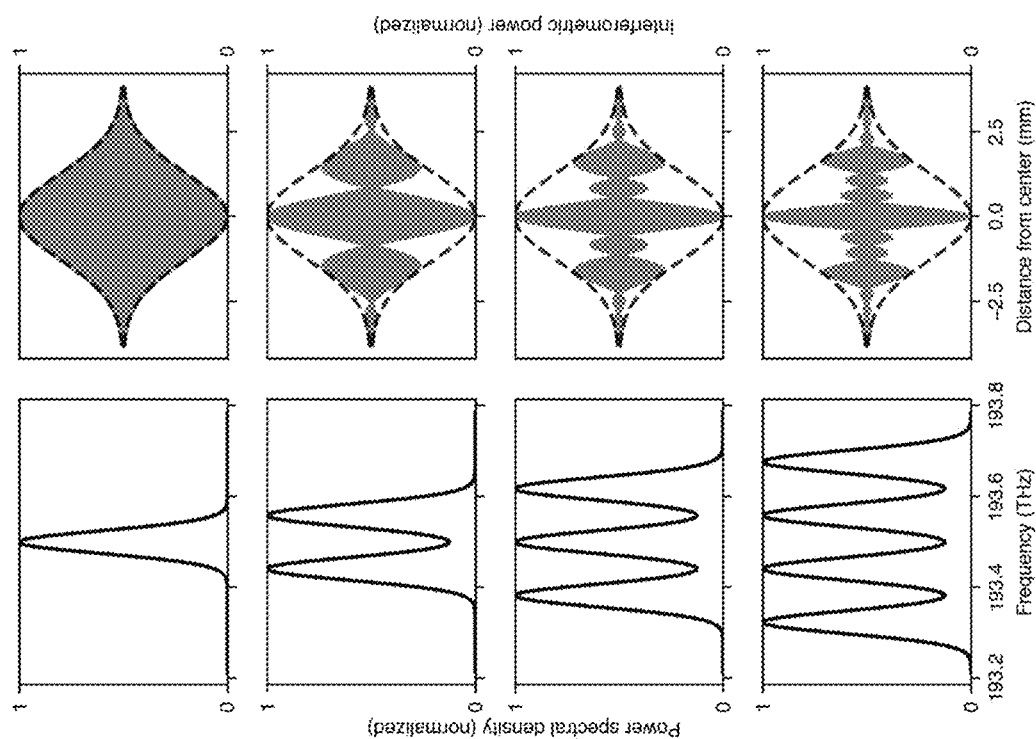
FIG. 8 schematically illustrates various example spectra of the interrogating laser light used to interrogate a FOG (left-side of FIG. 8) and the interferometric fringes (dark areas on the right-side of FIG. 8).

In certain implementations, a fiber-optic gyroscope can benefit from using interrogating lasers with multiple wavelengths. For example, FIG. 8 schematically illustrates various example spectra of the interrogating laser light used to interrogate a FOG (left side of FIG. 8). Using these spectra, a time-domain signal was generated (e.g., using an inverse Fourier transform of the spectra) and the time domain signal was used to interrogate a Mach-Zehnder interferometer (MZI). The dependence of the interferometric power on path length delay is plotted on the right side of FIG. 8 (note, the interferometric fringes are too close together to be resolved in FIG. 8). Two-wave interferometers caused by spurious interferometers in a FOG can create an error in the estimated rotation rate signal from the FOG. If the length mismatch of these interferometers changes (e.g., due to thermal fluctuations), the error will also change, introducing noise and drift, with the magnitude of the noise and drift proportional to the amplitude of the fringes. In certain implementations, as can be seen in FIG. 8, introducing multiple broadened peaks to the broadband spectrum can cause the average fringe visibility to decrease, which in turn can advantageously improve noise and drift in the interferometer (e.g., a FOG) driven by the multiple broadened peaks. The average fringe visibility can continue to decrease monotonically as more broadened peaks are added to the spectrum.

Figure 9A:
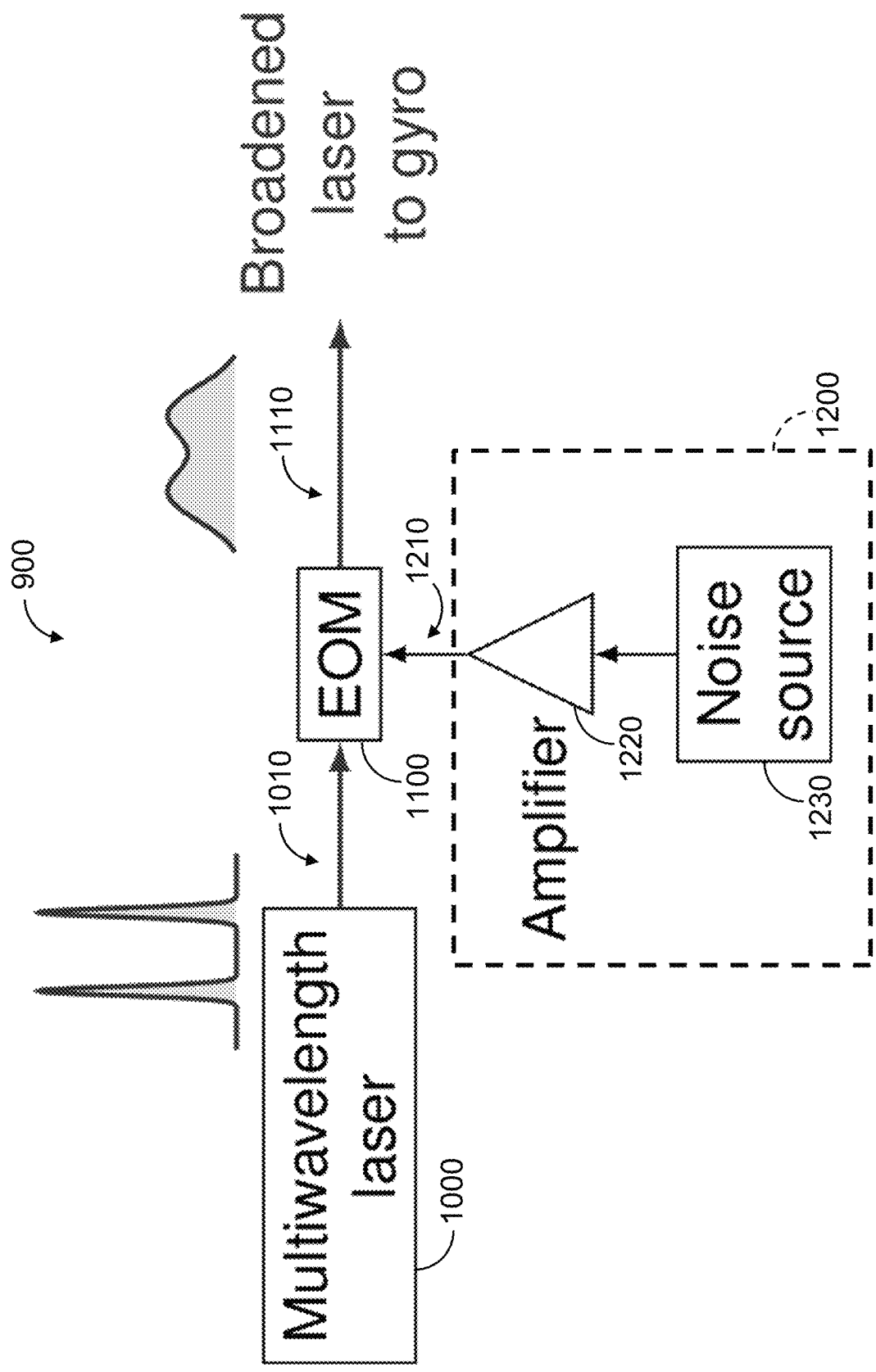
FIG. 9A schematically illustrates an example optical system comprising a laser source configured to generate laser light at a plurality of wavelengths in accordance with certain implementations described herein.

FIG. 9A schematically illustrates an example optical system 900 (e.g., broadened laser) comprising at least one laser source 1000 configured to generate laser light at a plurality of wavelengths in accordance with certain implementations described herein. The optical system 900 comprises at least one laser 1000 configured to generate first light 1010 having a first spectrum comprising a plurality of first peaks, each first peak having a corresponding peak wavelength (e.g., a stable mean wavelength) and a corresponding linewidth. For example, the first peaks can be generated by a single laser 1000 (e.g., a multiple-mode laser) and/or by a plurality of lasers 1000 (e.g., a plurality of single-mode lasers). In certain implementations, as schematically illustrated by FIG. 9A, adjacent first peaks do not substantially overlap one another, while in certain other implementations, adjacent first peaks do substantially overlap one another.

The optical system 900 further comprises a waveform generator 1200 configured to produce a noise waveform 1210. In certain implementations, the noise waveform 1210 is a Gaussian white-noise waveform, while in certain other implementations, the noise waveform 1210 has a probability density function (PDF) that is substantially Gaussian (e.g., a PRBS PDF with two delta functions at $\pm V_{sat}$, and a region with a substantially constant non-zero value between the two delta functions). In certain implementations, the noise waveform 1210 is seeded by a noise figure of the amplifier 1220, while in certain other implementations, the noise waveform 1210 is seeded by avalanche noise from a noise source 1230 (e.g., a reverse-biased Zener diode).

The optical system 900 further comprises an electro-optic phase modulator 1100 in optical communication with the at least one laser source 1000 and in electrical communication with the waveform generator 1200. The electro-optic phase modulator 1100 is configured to receive the first light 1010 having the first spectrum, to receive the noise waveform 1210, and to respond to the noise waveform 1210 by modulating the first light 1010 to produce second light 1110 having a second spectrum comprising a plurality of second peaks, each second peak having a corresponding peak wavelength and a corresponding linewidth, the peak wavelengths of the second peaks equal to the peak wavelengths of the first peaks, the linewidths of the second peaks broader than the linewidths of the corresponding first peaks. In certain implementations, adjacent second peaks do not substantially overlap one another, while in certain other implementations, adjacent second peaks do substantially overlap one another.

Figure 9B:
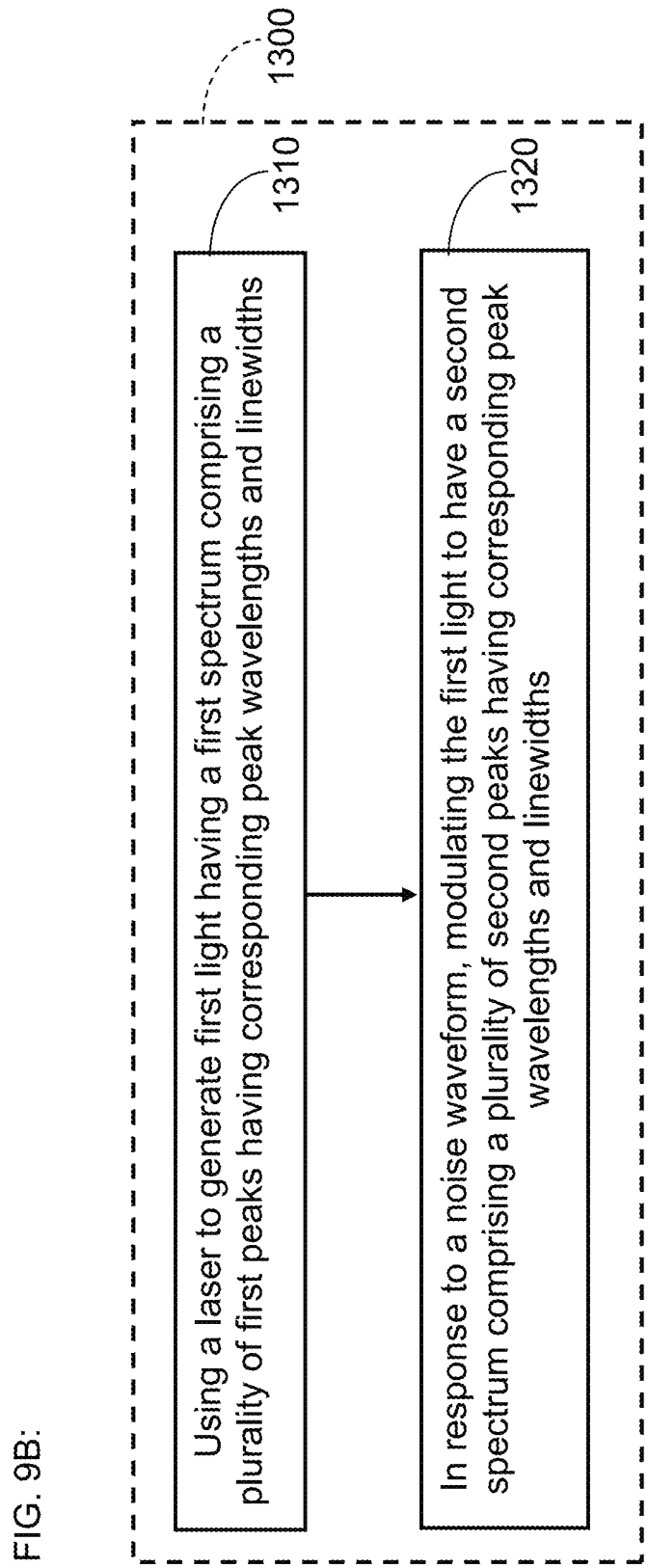
FIG. 9B is a flow diagram of an example method of producing laser-based broadband light for use in an optical device in accordance with certain embodiments described herein.

FIG. 9B is a flow diagram of an example method 1300 of producing laser-based broadband light for use in an optical device in accordance with certain embodiments described herein. In an operational block 1310, the method 1300 comprises using at least one laser to generate first light having a first spectrum comprising a plurality of first peaks, each first peak having a corresponding peak wavelength and a corresponding linewidth. In certain implementations, adjacent first peaks do not substantially overlap one another, while in certain other implementations, adjacent first peaks do substantially overlap one another. In an operational block 1320, the method further comprises, in response to a noise waveform, modulating the first light to have a second spectrum comprising a plurality of second peaks, each second peak having a corresponding peak wavelength and a corresponding linewidth, the peak wavelengths of the second peaks equal to the peak wavelengths of the first peaks, the linewidths of the second peaks broader than the linewidths of the first peaks. In certain implementations, adjacent second peaks do not substantially overlap one another, while in certain other implementations, adjacent second peaks do substantially overlap one another.

In general, the V value of an EOM is wavelength dependent, so the parameters used (e.g., by operating in the first U-shaped band) to broaden and to sufficiently suppress the carrier for narrowband laser signals at one wavelength (e.g., 1580 nm) are generally different from the parameters used to broaden and to sufficiently suppress the carrier for narrowband laser signals at different wavelength (e.g., 1520 nm). This general behavior would lead to the conclusion that it is not possible to broaden and to sufficiently suppress the carrier simultaneously for input laser light comprising multiple wavelengths. However, as described herein, there exist regions in the parameter space where the range of $V_{rms}$ and $V_{sat}$ combinations that efficiently suppress the carrier are broad enough, such that they can suppress the carrier over a range of wavelengths. In addition, by utilizing input laser light with a spectrum of discrete lines (e.g., lines having adjacent first peaks that do not substantially overlap one another), certain embodiments described herein generate a broadened laser output that comprises a non-continuous broadened spectrum (e.g., adjacent second peaks do not substantially overlap one another). Increasing the wavelength spacing between the broad regions of the output non-continuous broadened spectrum can decrease the coherence and can advantageously achieve a reduction of the noise and drift in a FOG that is greater than would be predicted by previous models.

The performance of high-accuracy FOGs is generally limited by the mean-wavelength stability of the optical source. Since the first peaks each have a mean wavelength that can vary independently of one another, it is not readily apparent that a broadened laser of certain implementations described herein would have a stable mean wavelength. However, a multi-wavelength broadened laser in accordance with certain implementations described herein do not have significantly inferior mean-wavelength stability. For example, for a large number N of wavelengths, the drift of each wavelength can be considered to be a random variable, such that the variance of the drift of the mean of the N wavelengths is less than the variance of the drift of each constituent wavelength (e.g., for a large number N of random variables, each with variance $\sigma^2$, the variance of their mean is $\sigma^2/N$). For another example, the drift in the mean wavelength can be due to environmental effects (e.g., thermal expansion) that can have the effect of shifting all wavelengths by the same amount, thereby inducing the same mean-wavelength instability, regardless of whether one or many wavelengths are being utilized.

In certain implementations, the EOM 1100 is designed to reduce $V_\pi$. For example, the EOM 1100 can comprise a crystal having a length in a range of 6 centimeters to 20 centimeters and having electrodes configured to apply a voltage across the crystal, the electrodes spaced from one another by a distance in a range of 2 microns to 10 microns. In certain implementations, the crystal length and electrode spacing are selected to allow for electronics with reduced bandwidth, cost, size, weight, and/or power. By not attempting to simultaneously provide uniform group delay, low noise figure, and gain flatness, the amplifier 1220 of certain implementations described herein is advantageously lighter, simpler, and less expensive than amplifiers conventionally used in other broadened laser systems.

In certain implementations, the phase modulation applied by the EOM 1100 to the input signal (e.g., the first light 1010 having the first spectrum) can be used to broaden multiple signals (e.g., the plurality of first peaks of the first spectrum) at different wavelengths simultaneously (e.g., with the amount of instantaneous phase shift applied given by $\varphi_N = \pi V_N / V_\pi$, where V is a function of wavelength). For example, 16 peaks, each broadened to 25 GHz, can result in 400 GHz of total linewidth. In certain implementations, broadening of multiple peaks can be used to achieve a stable-mean-wavelength broadband source suitable for interrogating strategic-grade FOGs.

Due to the frequency dependence of the V of the EOM 1100, the carrier suppression (e.g., determined by a combination of $V_{rms}/V_\pi$ and $V_{sat}/V_\pi$) will be different for each wavelength. For example, the EOM 1100 can apply a phase shift to the first light 1010 by modulating an effective optical path length of the first light 1010. For a laser peak wavelength equal to 1580 nm, an optical path length change equal to 1.58 microns results in a phase shift equal to 2n, but for a laser peak wavelength equal to 1520 nm, the optical path length change equal to 1.58 microns results in a phase shift equal to 2.08n (e.g., equal to a 1580/1520).

In certain implementations, the methods described herein with regard to FIG. 3 can be applied to find combinations of $V_{rms}$, and $V_{sat}$ that simultaneously suppress the residual carrier at two or more peaks having corresponding peak wavelengths and linewidths over a wide range of wavelengths (e.g., in a range of 1.48 microns to 1.6 microns for FOGs).

Figure 10:
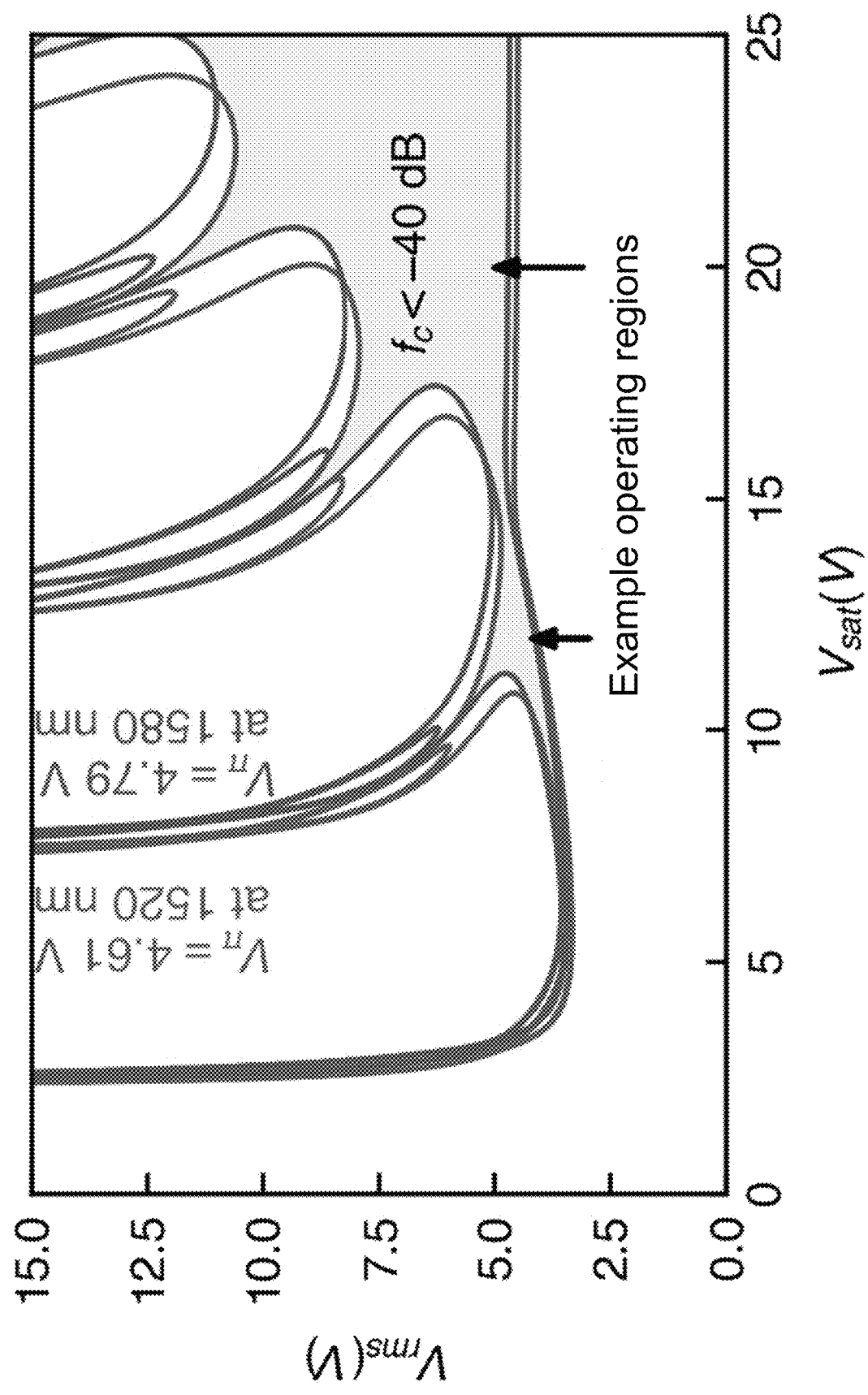
FIG. 10 is a plot of the calculated heat map of the carrier suppression $f_c$ as a function of $V_{rms}$ and $V_{sat}$ in accordance with certain implementations described herein.

FIG. 10 is a plot of the calculated heat map of the carrier suppression $f_c$ as a function of $V_{rms}$ and $V_{sat}$ in accordance with certain implementations described herein. The heat map of FIG. 10 shows the $f_c$ of 1520-nm and 1580-nm carriers with $V_\pi$ equal to 4.7 V at 1550 nm, with a wavelength dependence of $V_\pi = 4.7 * \lambda/(1550 \text{ nm})$ V. For example, the EOM 1100 can be configured to broaden a multiwavelength laser source 1000 that emits first light 1010 having a first spectrum comprising two first peaks having peak wavelengths at 1520 nm and 1580 nm, respectively, and corresponding linewidths (e.g., such that the two first peaks do not substantially overlap one another). As shown in FIG. 10, there are combinations of $V_{rms}$ and $V_{sat}$ for which the carriers for both of these wavelengths are suppressed. In FIG. 10, the blue and red contours outline settings of $V_{rms}$ and $V_{sat}$ for which the carriers at 1520 nm and 1580 nm are suppressed better than 40 dB. The shaded region shows overlap between the areas enclosed by the red and blue contours (e.g., settings of $V_{rms}$ and $V_{sat}$ for which both wavelengths are suppressed better than 40 dB). The shaded region just to the right of the bottom of the first U-shaped band of FIG. 10 corresponds to an operating region that is attainable with low values of $V_{sat}$, but with tight tolerances (e.g., easier to achieve with less powerful electronics or higher $V_\pi$ EOM). The shaded region to the right of the bottom of the second U-shaped band of FIG. 10 corresponds to an operating region with looser tolerances but utilizing larger values of $V_{sat}$ (e.g., more powerful electronics or lower $V_\pi$ EOM). For example, for first peaks in a range of 1520 nm to 1580 nm and a $V_\pi$ of 4.7 V at 1550 nm, the waveform generator 1200 can be operated with $V_{sat}/V_\pi$ in a range of 1 to 3 and $V_{rms}/V_\pi$ in a range of 0.7 to 1.1. The shaded region in the bottom portion of the second U-shaped band of FIG. 10 grows wider as the value of $V_{sat}$ is increased. More regions exist for higher values of $V_{sat}$. In certain implementations, $V_{sat}/V_\pi$ is in a range greater than 3 and $V_{rms}/V_\pi$ in a range greater than 0.8.

In certain implementations, the EOM 1100 is driven by noise yielding carrier suppression that is greater than or equal to −30 dB (e.g., greater than or equal to −35 dB; greater than or equal to −40 dB; greater than or equal to −50 dB; greater than or equal to −60 dB; greater than or equal to −70 dB) for two or more peak wavelengths within a predetermined range of wavelengths. For example, for FOG applications, the two or more peak wavelengths can be in a range of 1.48 microns to 1.6 microns. For another example, for LIDAR applications having a 1-cm resolution, the difference between the maximum peak wavelength and the minimum peak wavelength of the two or more peak wavelengths can be in a range of a few tenths of a nanometer (e.g., in a range of 1550 nm and 1550.25 nm to achieve a resolution of 1 centimeter). For another example, for ophthalmology applications having sub-millimeter resolution, the difference between the maximum peak wavelength and the minimum peak wavelength of the two or more peak wavelengths can be in a range of a tens of nanometers (e.g., in a range of 1540 nm and 1565 nm to achieve a resolution of 100 microns). The range of the two or more peak wavelengths can be centered around 1550 nm or around a different wavelength.

In certain implementations, the optical system 900 (e.g., broadened laser) is operated with a multiwavelength laser source 1000 that emits a comb of wavelengths (e.g., a comb of frequencies) within the predetermined range of wavelengths. For example, the EOM 1100 can be driven by noise yielding one of the black regions of FIG. 10, such that any carriers having peak wavelengths in a range of 1520 nm and 1580 nm are simultaneously suppressed by at least −30 dB. The optical system 900 (e.g., broadened laser) can be operated with the multiwavelength laser source 1000 emitting a comb of wavelengths within the range of 1520 nm to 1580 nm.

Figure 11:
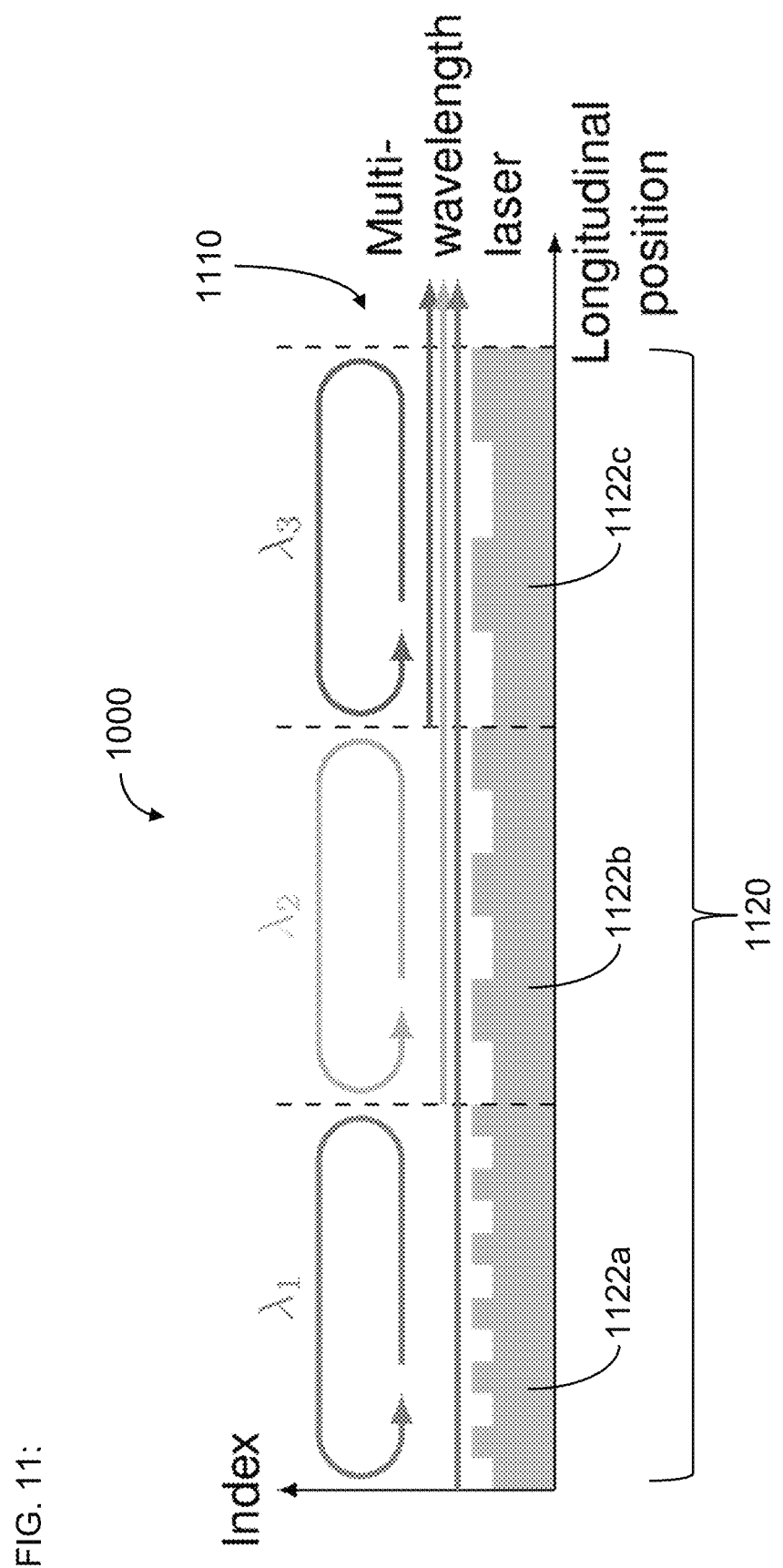
FIG. 11 schematically illustrates an example laser source configured to generate laser light having a plurality of peak wavelengths in accordance with certain implementations described herein.

FIG. 11 schematically illustrates an example laser source 1000 configured to generate laser light having a plurality of peak wavelengths (e.g., $\lambda_1, \lambda_2, \lambda_3, \ldots$) in accordance with certain implementations described herein. The laser source 1000 comprises a fiber laser having an optically active region 1120 (e.g., an erbium-doped fiber) with a periodically varying (e.g., modulated) index of refraction, forming a grating 1130 having a plurality of regions 1122 having different periods from one another (e.g., a variable period grating). The fiber laser 1120 is configured to lase at different wavelengths within each of the different regions 1122, thereby providing a multiwavelength laser configured to be used for seeding a multiwavelength broadened laser. In certain implementations, as schematically illustrated by FIG. 11, the modulation periods of the different regions 1122 vary discretely (e.g., each region 1122a, b, c has a corresponding uniform period different from those of the other regions 1122a, b, c), while in certain other implementations, the modulation periods of the different regions 1122 have continuously varying (e.g., chirped) periods (see, e.g., Y. Kim et al., "50-Channel 100-GHz-Spaced Multiwavelength Fiber Lasers with Single-Frequency and Single-Polarization Operation," IEEE Photonics Technology Letters, vol 20, no. 20, pp. 1718 (2008)).

In certain implementations, as schematically illustrated by FIG. 17A, the peak wavelengths of the first light 1010 outputted from the laser source 1000 are spaced sufficiently close together such that when broadened, the peaks of the second light 1110 substantially overlap (e.g., adjacent peaks of the second light 1110 substantially overlap one another). For example, 100 peak wavelengths (e.g., lines) can be spaced evenly by 1 kHz in the first light 1010 spectrum and can each be broadened by 1 GHz, thereby creating a broadened laser with second light 1110 having a spectrum with a total linewidth of 99 GHz. As used herein, the phrase "substantially overlap" refers to a spectral overlap in which (i) the spectral areas of two peaks overlap one another by at least 25% (e.g., at least 30%; at least 40%) of the area of either of the two peaks and/or (ii) the peak wavelengths of the two peaks are separated by less than one full width at half maximum of either one of the two peaks. As used herein, the phrase "adjacent peaks" refers to two peaks of the spectrum that do not have a third peak between the two peaks.

In certain other implementations, as schematically illustrated by FIG. 17B, the peak wavelengths of the first light 1010 outputted from the laser source 1000 are not spaced close together and the peaks of the second light 1110 do not substantially overlap (e.g., adjacent peaks of the second light 1110 do not substantially overlap one another). As used herein, the phrase "do not substantially overlap" refers to a spectral overlap in which (i) the spectral areas of two peaks overlap one another by less than 25% (e.g., less than 30%; less than 40%) of the area of either of the two peaks and/or (ii) the peak wavelengths of the two peaks are separated by more than one full width at half maximum of either one of the two peaks. Certain such implementations can make maximal use of the broadening by the EOM 1100. For example, 100 peak wavelengths (e.g., lines) can be spaced evenly by 10 GHz in the first light 1010 spectrum and can each be broadened by 1 GHz, thereby creating a broadened laser with second light 1111 having a spectrum that resembles a comb of frequencies each broadened to 10 GHz. Numerical simulations, as well as measurements (see, e.g., Yang et al., "Investigation on dispersion of $V_\pi$ of multifunction integrated optical circuit," 26th International Conference on Optical Fiber Sensors (2019)) show that the broadened spectrum need not be continuous to achieve the benefits of added linewidth provided by a multiwavelength laser.

APPENDIX: DERIVATION OF THE BROADENED LINEWIDTH

Prior investigations (see, e.g., Middleton 1996; Chamoun 2016) reported a numerical method to calculate a lineshape of a broadened laser in the transition region between weak modulation (e.g., where the broadened laser output power has a top-hat lineshape) and strong modulation (e.g., where the broadened laser output power has a Gaussian lineshape) with no saturation. As described herein, an analytical approximation of the lineshape is derived for any modulation strength while accounting for saturation. The broadband noise voltage $V_N(t)$ of bandwidth $\omega_{max}$ can be approximated as a Fourier sum of a large number N of equally spaced discrete frequencies. Each component has a frequency $\omega_i$ (e.g., spaced by $\omega_{max}/N$) and a random phase $\varphi_i$. The rms value of $V_N(t)$ is $V_{rms}$, and the rms voltage of each of the components is $V_{rms}/\sqrt{N}$. Because the peak value of a sinusoidal signal is $\sqrt{2}$ times its rms value, $V_N(t)$ can be expressed as:

$$V_N(t) = \sum_{i=1}^{N} \sqrt{\frac{2}{N}} V_{rms} \sin(\omega_i t + \varphi_i) \tag{12}$$

An EOM driven by broadband noise can be modeled as a series of N EOMs, each driven at $\omega_i$ and producing sidebands at $\pm\omega_i$. The output spectrum of this chain can be obtained by convolving the spectrum of these sidebands with each other (see, e.g., Middleton 1996, J. Spilker, "Statistical design and evaluation of demodulation systems for angle-modulated sinusoids," Lockheed Missile and Space Division, Palo Alto, Calif., Tech. Rept. LMSD-48496, April 1959 for weak modulation; see, e.g., Abramson 1963 for strong modulation). Assuming no saturation, so that each EOM provides the same phase-modulation amplitude $\Phi_p = (2/N)^{1/2} \pi V_{rms}/V_\pi$, the optical spectrum $S(\omega)$ of the output of an EOM after phase modulation from a single frequency component at $\omega_i$ can be expressed by the Jacobi-Anger expansion:

$$S(\omega) = P_0 \sum_{m=-\infty}^{m=\infty} J_m^2(\Phi_p) \delta(m\omega - \omega_0). \tag{13}$$

where $P_0$ is the output power and $\omega_0$ the carrier frequency. For weak modulation, $V_{rms}$ is small, and so is $\Phi_p$. Only the terms in $|m| \le 1$ are significant. $J_0^2(\Phi_p) \approx 1$, and $J_{\pm 1}^2(\Phi_p) \approx (\Phi_r^2/(2N))$, where $\Phi_r = \pi V_{rms}/V_\pi$. The output spectrum of the first EOM contains the $\omega_0$ component with power that is about equal to $P_0$, and two sidebands at $\omega_0 \pm \omega_1$ each with a power $P_0 \Phi_r^2/2N$.

The second EOM adds sidebands at $\pm \omega_2$ for each discrete frequency output by the first EOM. Thus, its output contains the $\omega_0$ component with power about equal to $P_0$, the unmodified sidebands from the first EOM at $\omega_0 \pm \omega_1$ with power $P_0 \Phi_r^2/2N$, the sidebands of the carrier created by the second EOM at $\omega_0 \pm \omega_2$ with power $P_0 \Phi_r^2/2N$, and sidebands of sidebands at $\omega_0 \pm \omega_1 \pm \omega_2$ with power $P_0 \Phi_r^4/4N^2$, which are negligible.

By induction, the output of the last EOM can be approximated as a central carrier with power $f_c P_0$ (where $f_c$ is determined using the methods described herein), surrounded by a frequency comb of sidebands each with power $P_0 \Phi_r^2/2N$. Since N is large, this comb can be written as a continuous top-hat distribution with total power $P_0 \Phi_r^2$ and half-width $\omega_{max}$. If the RF-noise spectrum is not flat, then the sidebands have different powers given by $P_0 \Phi_i^2/2N$, where $\Phi_i = \pi V_{rms,i}/V_\pi$, and $V_{rms,i}$ is determined by the power in the band (ex, $\omega_i + \omega_{max}/N$). The resultant shape of the broadened laser will no longer be a top-hat distribution, but will resemble the PSD of the RF noise, translated to and mirrored about the carrier frequency.

As $V_{rms}$ is increased (but still in the limit of no saturation), the weak-modulation approximations no longer hold, and the spectral shape evolves. Specifically, each first-order sideband becomes attenuated by $J_0^2(\Phi_p)$ (which no longer is about equal to 1) at each EOM and the power in the sidebands of sidebands is no longer negligible. In this case, the power remaining in the carrier frequency can be accurately modeled by using Eq. (7) to describe $f_c$. The power in the top-hat distribution (which consists entirely of sidebands of the central carrier) is reduced by a factor of $J_0^2(\Phi_p)$ a total of N times. After passing through N EOMs, the power remaining in the top-hat distribution can be expressed as:

$$\lim_{N\to\infty}(J_0^2(\Phi_r)^N) = e^{-\Phi_r^2} \tag{14}$$

The rest of the power can be modeled as repeated convolutions of sidebands of sidebands. The central limit theorem states that repeated convolutions of PDFs yield a Gaussian spectrum whose variance is the sum of the variance of each constituent PDF. Hence, the fraction of power in the carrier is $f_c$, in the top hat is $f_t = \Phi_r^2 \exp(-\Phi_r^2)$, and in the Gaussian $f_g = 1 - f_t - f_c$.

To calculate the linewidth of the Gaussian distribution, the variances of the spectra generated by phase modulation of a single input frequency by each discrete frequency component can be simply added. The variance $\sigma_n^2$ of the Jacobi-Anger expansion given in Eq. (13) for a single frequency $\omega_i$ can be expressed as:

$$\sigma_1^2 = \sum_{m=-\infty}^{m=\infty} J_m^2(\Phi_p)(m\omega_i)^2 = \frac{\omega_i^2}{N}\Phi^2 \tag{15}$$

Adding these variances gives:

$$\sigma^2 = \sum_{n=1}^{N} \frac{(n\omega_{max}/N)^2}{N}\Phi_r^2 = \frac{\omega_{max}^2}{3}\Phi_r^2 + O(N^{-1}) \tag{16}$$

When saturation is present, the derivation can be the same except for how $V_{rms}$ is determined. Numerical simulations show that saturation reduces all components of the Fourier series equally by a factor $V_{rms}/V'_{rms}$, where $V'_{rms}$ is determined by calculating the variance of the PDF (e.g., shown in FIG. 3):

$$V'_{rms} = \sqrt{\int_{-\infty}^{\infty} p(V)V^2 dV} \tag{17}$$

$$= \sqrt{\int_{-V_{sat}}^{V_{sat}} \frac{V^2 e^{-V^2/(2V_{rms}^2)}}{\sqrt{2\pi V_{rms}^2}}dV + V_{sat}^2\left(1 - erf\left(\frac{V_{sat}}{\sqrt{2}\,V_{rms}}\right)\right)}$$

For $V_{rms} \ll V_{sat}$, $V'_{rms} \approx V_{rms}$. For $V_{sat} \gg V_{rms}$, $V'_{rms} \approx V_{sat}$.

The total broadened spectrum is the superposition of the residual carrier with amplitude $f_c$, a top-hat lineshape of half-width $\omega_{max}$ and amplitude $f_t$, and a Gaussian lineshape with a standard deviation $\omega_{max}\pi V'_{rms}/V_\pi/\sqrt{3}$ and amplitude $1-f_c-f_t$, where $f_t$ is calculated using $V'_{rms}$ instead of $V_{rms}$.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It is to be appreciated that the implementations disclosed herein are not mutually exclusive and may be combined with one another in various arrangements. In addition, various implementations described herein can be incorporated in a variety of other suitable devices, methods, and contexts.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the methods and systems are discussed herein in terms of elements labeled by ordinal adjectives (e.g., first, second, etc.), the ordinal adjective are used merely as labels to distinguish one element from another (e.g., one signal from another or one circuit from one another), and the ordinal adjective is not used to denote an order of these elements or of their use.

Various configurations have been described above. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An optical system comprising:
   at least one laser source configured to generate first light having a first spectrum comprising a plurality of first peaks, each first peak having a corresponding peak wavelength and a corresponding linewidth;
   a waveform generator configured to produce a noise waveform; and
   an electro-optic phase modulator in optical communication with the at least one laser source and in electrical communication with the waveform generator, the electro-optic phase modulator configured to receive the first light, to receive the noise waveform, and to respond to the noise waveform by modulating the first light to produce second light having a second spectrum comprising a plurality of second peaks, each second peak having a corresponding peak wavelength and a corresponding linewidth, the peak wavelengths of the second peaks equal to the peak wavelengths of the first peaks and the linewidths of the second peaks broader than the linewidths of the corresponding first peaks.

2. The optical system of claim 1, wherein adjacent second peaks substantially overlap one another.

3. The optical system of claim 2, wherein adjacent first peaks do not substantially overlap one another.

4. The optical system of claim 2, wherein adjacent first peaks substantially overlap one another.

5. The optical system of claim 1, wherein adjacent second peaks do not substantially overlap one another.

6. The optical system of claim 1, wherein the at least one laser source comprises a multiple-mode laser.

7. The optical system of claim 1, wherein the waveform generator comprises at least one noise source and at least one amplifier configured to amplify a source noise waveform from the at least one noise source to produce the noise waveform.

8. The optical system of claim 7, wherein a final amplifier of the at least one amplifier has a gain G and saturation voltage level $V_{sat}$, the waveform generator generates a noise voltage $V_N(t)$ having a probability density function with a standard deviation $V_{rms} = G v_{rms}$ where $v_{rms}$ is the rms value of the input noise to the final amplifier, and the electro-optic phase modulator is configured such that a voltage $V_\pi$ produces a $\pi$-phase shift.

9. The optical system of claim 8, wherein the first peaks are in a range of 1520 nm to 1580 nm, and $V_{sat}/V_\pi$ is in a range of 0.5 to 3 and $V_{rms}/V_\pi$ is in a range of 0.7 to 1.1.

10. The optical system of claim 8, wherein the first peaks are in a range of 1520 nm to 1580 nm, and $V_{sat}/V_\pi$ is in a range of greater than 3 and $V_{rms}/V_\pi$ is in a range greater than 0.8.

11. The optical system of claim 1, further comprising a sensor in optical communication with the electro-optic phase modulator and configured to receive at least a portion of the second light.

12. The optical system of claim 11, wherein the sensor comprises a fiber-optic gyroscope (FOG).

13. The optical system of claim 12, wherein the optical system further comprises a multifunction integrated-optic chip (MIOC) and the FOG comprises a sensing coil in optical communication with the MIOC, the MIOC in optical communication with the electro-optic phase modulator and configured to receive the second light from the electro-optic phase modulator.

14. The optical system of claim 13, wherein the MIOC comprises a polarizer, a Y-junction, and push-pull phase modulators driven by a square-wave modulation signal at the loop proper frequency.

15. The optical system of claim 13, wherein the sensing coil comprises a quadrupolar-wound polarization-maintaining fiber having a coil length greater than 1 kilometer.

16. The optical system of claim 13, wherein the MIOC and the sensing coil are contained within a thermally isolated enclosure.

17. The optical system of claim 1, further comprising a polarizer configured to polarize an output of the electro-optic phase modulator.

18. A method of producing laser-based broadband light for use in an optical device, the method comprising:
   using at least one laser to generate first light having a first spectrum comprising a plurality of first peaks, each first peak having a corresponding peak wavelength and a corresponding linewidth, and adjacent first peaks not substantially overlapping one another; and
   in response to a noise waveform, modulating the first light to have a second spectrum comprising a plurality of second peaks, each second peak having a corresponding peak wavelength and a corresponding linewidth, the peak wavelengths of the second peaks equal to the peak wavelengths of the first peaks, the linewidths of the second peaks broader than the linewidths of the first peaks.

19. The method of claim 18, wherein adjacent second peaks substantially overlap one another.

20. The method of claim 18, wherein adjacent second peaks do not substantially overlap one another.

21. The method of claim 18, wherein the noise waveform is a Gaussian white-noise waveform.

22. The method of claim 18, wherein the noise waveform has a probability density function that is a pseudo-random bit sequence (PRBS) PDF with two delta functions at $\pm V_{sat}$, and a region with a substantially constant non-zero value between the two delta functions.

23. The method of claim 18, further comprising inputting at least a portion of the second light into at least one sensor.

24. The method of claim 23, wherein the at least one sensor comprises a fiber-optic gyroscope.

* * * * *

UNITED STATES PATENT AND TRADEMARK OFFICE
CERTIFICATE OF CORRECTION

PATENT NO. : 11,231,278 B1
APPLICATION NO. : 17/071212
DATED : January 25, 2022
INVENTOR(S) : Digonnet et al.

It is certified that error appears in the above-identified patent and that said Letters Patent is hereby corrected as shown below:

In the Specification

Column 4, Line 67, delete "$\Delta v \approx c/AT$." and insert --$\Delta v \approx c/\Delta L$.--.

Column 13, Line 50, delete "V value)." and insert --$V_\pi$ value).--.

Column 14, Line 34, delete "a1" and insert --$\alpha_1$--.

Column 14, Line 56, delete "as" and insert --$\alpha_2$--.

Column 15, Line 23, delete "as =0 dB" and insert --$\alpha_2$=0 dB--.

Column 15, Line 25, delete "as =0 dB" and insert --$\alpha_2$=0 dB--.

Column 16, Line 5, delete "cu," and insert --$\alpha_1$,--.

Column 16, Line 37, delete "as" and insert --$\alpha_2$--.

Column 16, Line 39, delete "$V_{rms}=V_{rms,0}10\cdot(\alpha 1/20)$," and insert --$V_{rms}=V_{rms,0}\cdot 10^{\wedge}(\alpha 1/20)$,--.

Column 18, Line 50, delete "V" and insert --$V_\pi$--.

Column 20, Line 23, delete "V" and insert --$V_\pi$--.

Column 21, Line 23, delete "V" and insert --$V_\pi$--.

Column 21, Line 39, delete "2.08n (e.g., equal to a 1580/1520)." and insert
--$2.08\pi$ (e.g., equal to $2\pi \cdot 1580/1520$).--.

Signed and Sealed this
Third Day of May, 2022

Katherine Kelly Vidal
*Director of the United States Patent and Trademark Office*

CERTIFICATE OF CORRECTION (continued)
U.S. Pat. No. 11,231,278 B1

In the Claims

Column 27, Line 59, Claim 8, delete "it-phase" and insert --π-phase--.